US012619942B2

(12) United States Patent
Dixon, Jr. et al.

(10) Patent No.: US 12,619,942 B2
(45) Date of Patent: \*May 5, 2026

(54) SYSTEMS AND METHODS FOR DELIVERING ITEMS HAVING ENCODED DELIVERY POINTS

(71) Applicant: United States Postal Service, Washington, DC (US)

(72) Inventors: Robert E. Dixon, Jr., Haymarket, VA (US); Gary C. Reblin, Falls Church, VA (US); Naomi Miller, Washington, DC (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,244

(22) Filed: Nov. 8, 2024

(65) Prior Publication Data

US 2025/0069024 A1      Feb. 27, 2025

Related U.S. Application Data

(63) Continuation of application No. 18/343,328, filed on Jun. 28, 2023, now Pat. No. 12,154,066, which is a
(Continued)

(51) Int. Cl.
| | |
|---|---|
| *G06Q 10/083* | (2024.01) |
| *G06K 7/14* | (2006.01) |
| *G06K 19/06* | (2006.01) |

(52) U.S. Cl.
CPC ......... *G06Q 10/083* (2013.01); *G06K 7/1413* (2013.01); *G06K 19/06028* (2013.01)

(58) Field of Classification Search
CPC ......... G06K 19/07786; G06K 19/0772; G06K 7/1413; G06K 19/06028; G06Q 10/083; G06Q 10/08; G06Q 10/0835
(Continued)

(56) References Cited

U.S. PATENT DOCUMENTS

| | | | |
|---|---|---|---|
| 5,422,821 A | 6/1995 | Allen et al. | |
| 5,454,038 A | 9/1995 | Cordery et al. | |
(Continued)

FOREIGN PATENT DOCUMENTS

| | | |
|---|---|---|
| JP | 01-159088 A | 6/1989 |
| JP | 2002-230373 A | 8/2002 |
(Continued)

OTHER PUBLICATIONS

Anonymous: "Mail sorter—Wikipedia", May 11, 2015 (May 11, 2015), XP055708743, Retreived from theInternet: URL:https://en.wikipedia.org/w/index.php?title=Mail_sorter&oldid=661866552[retreived on Jun. 25, 2020].
(Continued)

*Primary Examiner* — Edwyn Labaze
(74) *Attorney, Agent, or Firm* — Knobbe, Martens, Olson & Bear, LLP

(57)      ABSTRACT

Systems and methods for delivering items are disclosed. The systems and methods comprise assigning a unique internal control value to each profile having an identified physical address delivery point. They also receive a request for delivery point information for each of a plurality of items to be distributed and providing a response comprising a list of internal control values thereto. They further receive a plurality of items, each item having printed thereon one of the internal control values on the list. For each of the plurality of items, they scan, by item processing equipment, the item to read the internal control value printed thereon, identifying, in the profile database, the physical address delivery point corresponding to the assigned internal control value, routing, by the item processing equipment, the item according to the identified physical address delivery point, and delivering the item to the identified physical address delivery point.

20 Claims, 13 Drawing Sheets

Related U.S. Application Data continuation of application No. 17/010,671, filed on Sep. 2, 2020, now Pat. No. 11,694,148.

(60) Provisional application No. 62/895,433, filed on Sep. 3, 2019.

(58) Field of Classification Search
USPC .................. 705/330, 1.1; 235/385, 376, 375
See application file for complete search history.

(56) References Cited

U.S. PATENT DOCUMENTS

| | | | |
|---|---|---|---|
| 5,892,900 A | 4/1999 | Ginter et al. |
| 5,893,464 A | 4/1999 | Kiani et al. |
| 6,519,571 B1 | 2/2003 | Guheen et al. |
| 6,671,813 B2 | 12/2003 | Ananda |
| 6,961,711 B1 | 11/2005 | Chee |
| 7,124,101 B1 | 10/2006 | Mikurak |
| 8,060,756 B2 | 11/2011 | Rao et al. |
| 8,862,901 B2 | 10/2014 | Rao et al. |
| 10,437,435 B2 | 10/2019 | Ladden et al. |
| 10,572,851 B2 | 2/2020 | Skaaksrud |
| 10,592,845 B2 | 3/2020 | Skaaksrud |
| 10,671,962 B2 | 6/2020 | Skaaksrud |
| 10,726,382 B2 | 7/2020 | Skaaksrud |
| 10,726,383 B2 | 7/2020 | Skaaksrud |
| 10,860,973 B2 | 12/2020 | Skaaksrud |
| 10,911,571 B2 | 2/2021 | Goel et al. |
| 11,049,062 B2 | 6/2021 | Skaaksrud |
| 11,238,397 B2 | 2/2022 | Skaaksrud |
| 2003/0149674 A1 | 8/2003 | Good et al. |
| 2003/0158785 A1 | 8/2003 | Erca |
| 2003/0182017 A1 | 9/2003 | O'Donohue et al. |
| 2003/0231112 A1 | 12/2003 | Raju |
| 2004/0002903 A1 | 1/2004 | Stolfo |
| 2004/0128254 A1 | 7/2004 | Pintsov |
| 2004/0128524 A1 | 7/2004 | Ezaki |
| 2004/0174259 A1 | 9/2004 | Peel et al. |
| 2004/0233065 A1 | 11/2004 | Freeman |
| 2004/0246130 A1 | 12/2004 | Lambright et al. |
| 2005/0205719 A1 | 9/2005 | Hendrickson et al. |
| 2005/0222853 A1 | 10/2005 | Black et al. |
| 2005/0226514 A1 | 10/2005 | Getzinger et al. |
| 2005/0251330 A1 | 11/2005 | Waterhouse et al. |
| 2005/0259658 A1 | 11/2005 | Logan et al. |
| 2006/0030969 A1 | 2/2006 | Norris et al. |
| 2006/0136237 A1 | 6/2006 | Spiegel et al. |
| 2007/0187183 A1 | 8/2007 | Saigh et al. |
| 2008/0288785 A1 | 11/2008 | Rao et al. |
| 2009/0164662 A1 | 6/2009 | Mather |
| 2010/0230328 A1 | 9/2010 | Bonnell et al. |
| 2011/0066281 A1 | 3/2011 | Ksiazek |
| 2012/0047373 A1 | 2/2012 | Rao et al. |
| 2013/0024326 A1 | 1/2013 | Dearing et al. |
| 2014/0081951 A1 | 3/2014 | Greenspan et al. |
| 2014/0330738 A1 | 11/2014 | Falcone et al. |
| 2015/0227890 A1 | 8/2015 | Bednarek et al. |
| 2016/0171439 A1 | 6/2016 | Ladden et al. |
| 2016/0232479 A1 | 8/2016 | Skaaksrud |
| 2016/0232481 A1 | 8/2016 | Skaaksrud |
| 2016/0232484 A1 | 8/2016 | Skaaksrud |
| 2016/0232485 A1 | 8/2016 | Skaaksrud |
| 2016/0232486 A1 | 8/2016 | Skaaksrud |
| 2016/0232488 A1 | 8/2016 | Skaaksrud |
| 2016/0232489 A1 | 8/2016 | Skaaksrud |
| 2017/0154304 A1 | 6/2017 | Aryeetey et al. |
| 2017/0193444 A1 | 7/2017 | Dearing |
| 2017/0228687 A1 | 8/2017 | Stephen et al. |
| 2017/0320101 A1 | 11/2017 | Bombaugh et al. |
| 2018/0246983 A1 | 8/2018 | Rathod |
| 2018/0357848 A1 | 12/2018 | McLellan et al. |
| 2019/0026692 A1 | 1/2019 | Dearing et al. |
| 2019/0102805 A1 | 4/2019 | Gersh |
| 2019/0156280 A1 | 5/2019 | Skaaksrud |
| 2019/0161190 A1 | 5/2019 | Gil et al. |
| 2019/0228375 A1 | 7/2019 | Laury et al. |
| 2019/0311325 A1 | 10/2019 | Reblin |
| 2021/0042694 A1 | 2/2021 | Skaaksrud |
| 2021/0065105 A9 | 3/2021 | Skaaksrud |

FOREIGN PATENT DOCUMENTS

| | | | | |
|---|---|---|---|---|
| JP | 2008-117027 A | 5/2008 | | |
| JP | 2012-012177 A | 1/2012 | | |
| JP | 2014-203103 A | 10/2014 | | |
| KR | 2001-0076609 | 8/2001 | | |
| RU | 2597572 C1 | 9/2016 | | |
| WO | WO 99/06161 A1 | 2/1999 | | |
| WO | WO 2006/065945 A2 | 6/2006 | | |
| WO | WO-2008047117 A2 * | 4/2008 | ....... | G07B 17/00435 |
| WO | WO 2015/089570 | 6/2015 | | |
| WO | WO 2017/059129 A1 | 6/2017 | | |

OTHER PUBLICATIONS

Anonymous: "Multiline optical-character reader—Wikipedia", Sep. 14, 2014 (Sep. 14, 2014), XP055708744, Retrieved from the Internet: URL:https://en.wikipedia.org/w/index.php?title=Multiline_opticalcharacterreader&oldid=625579046 [retrieved on Jun. 25, 2020].

Bruce Schneier. NSA surveillance: A guide to staying secure. (Sep. 6, 2013). Retrieved online May 7, 2021. https://www.theguardian.com/world/2013/sep/05/nsa-how-to-remain-secure-surveillance (Year: 2013).

Endicia. Understanding FIM (Facing Identification Marks) on Envelopes. (Dec. 7, 2004).Retrieved online May 7, 2021. https://www.endicia.com/tools-resources/hanrys-hints/facing-identification-marks (Year: 2004).

Fortin et. Forti Mail Identity Based Encryption a Business and Compliance Enabler. (Oct. 15, 2011). Retrieved online Oct. 22, 2020. https ://www.fortinet.com/content/dam/fortinet/assets/white-papers/fortimail-identity-based-encryption .pdf (Year: 2011).

International Search Report and Written Opinion dated Dec. 29, 2016 in International Application No. PCT/US16/54529.

International Preliminary Report on Patentability dated Oct. 6, 2017 in International Application No. PCT/US16/54529.

International Search Report and Written Opinion mailed Jun. 14, 2019 in International Application No. PCT/US2019/025434.

* cited by examiner

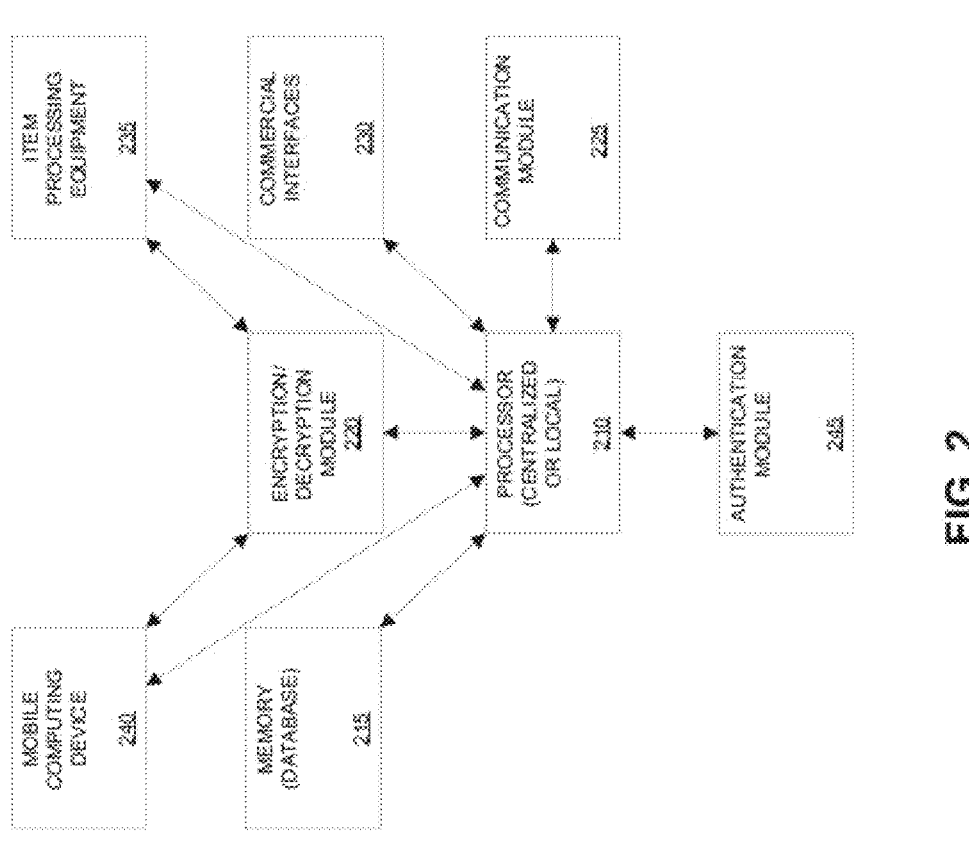
FIG. 2

500

START 502

RECEIVE USER REQUEST FOR ANONYMOUS DELIVERY POINT 504

RECEIVE USER INFORMATION AND PHYSICAL LOCATION INFORMATION 506

ASSOCIATE THE ANONYMOUS DELIVERY POINT WITH THE PHYSICAL LOCAITON INFORMATION 508

ENCRYPT ANONYMOUS DELIVERY POINT INFORMATION 510

PROVIDE ENCRYPTED ANONYMOUS DELIVERY POINT INFORMATION TO THE USER 512

END 514

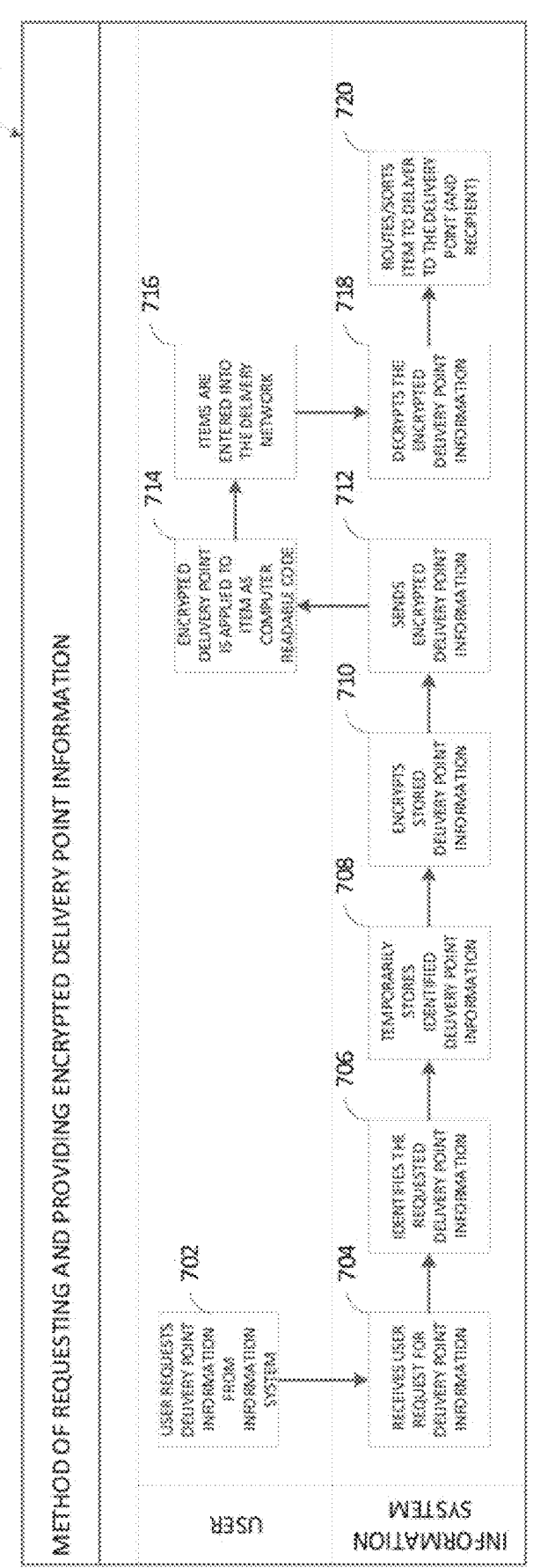

METHOD OF REQUESTING AND PROVIDING ENCRYPTED DELIVERY POINT INFORMATION

700

USER

702 — USER REQUESTS DELIVERY POINT INFORMATION FROM INFORMATION SYSTEM

INFORMATION SYSTEM

704 — RECEIVES USER REQUEST FOR DELIVERY POINT INFORMATION

706 — IDENTIFIES THE REQUESTED DELIVERY POINT INFORMATION

708 — TEMPORARILY STORES IDENTIFIED DELIVERY POINT INFORMATION

710 — ENCRYPTS STORED DELIVERY POINT INFORMATION

712 — SENDS ENCRYPTED DELIVERY POINT INFORMATION

714 — ENCRYPTED DELIVERY POINT IS APPLIED TO ITEM AS COMPUTER READABLE CODE

716 — ITEMS ARE ENTERED INTO THE DELIVERY NETWORK

718 — DECRYPTS THE ENCRYPTED DELIVERY POINT INFORMATION

720 — ROUTES/SORTS ITEM TO DELIVER TO THE DELIVERY POINT (AND RECIPIENT)

SYSTEMS AND METHODS FOR DELIVERING ITEMS HAVING ENCODED DELIVERY POINTS

CROSS-REFERENCE TO RELATED APPLICATIONS

This application is a continuation of U.S. application Ser. No. 18/343,328, filed Jun. 28, 2023, which is a continuation of U.S. application Ser. No. 17/010,671, filed Sep. 2, 2020, now U.S. Pat. No. 11,694,148, which claims the benefit of priority to U.S. Provisional Application Ser. No. 62/895,433 filed Sep. 3, 2019, the entire contents of which are hereby incorporated by referenced herein for all purposes. This application is related to U.S. application Ser. No. 16/373, 465, which claims the benefit of priority to U.S. Provisional application No. 62/652,728 filed Apr. 4, 2018 and 62/732, 894, filed Sep. 18, 2018, the entire contents of each of which are hereby incorporated by reference. Any and all applications for which a foreign or domestic priority claim is identified in the Application Data Sheet as filed with the present application are hereby incorporated by reference under 37 CFR 1.57.

BACKGROUND

This disclosure relates to a system and method for coordinating delivery of an item or a plurality of items using delivery point information which had been anonymized, and/or encrypted.

The delivery of items by a distribution system or network involves processing and handling each of the items being delivered. Generally, a sender sends and item to a delivery point using an address or identifier related to the physical address. Without this information being indicated on the item, the distribution system will be unable to deliver the item to a recipient. However, the sender may not have access to, or the recipient may desire that the sender not have access to the recipient's physical address or delivery point information, and thus, may be unable to send an item to the recipient through the distribution system. Thus, systems and methods configured to generate and process the anonymous and/or encrypted delivery point information are desired.

SUMMARY

Various implementations of methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the invention described herein includes a method of delivering items to a delivery point. The method comprises assigning, in a profile database, a unique internal control value to each profile having an identified physical address delivery point, wherein each unique internal control value has a character length equal to a character length of delivery point information printed on a physical distribution item, wherein each unique internal control value comprises a prefix code shared by multiple internal control values and a unique portion unique to the unique internal control value. The method further comprises receiving, via a sender interface, a request for delivery point information for each of a plurality of items to be distributed, the request including recipient criteria and identifying, in the profile database, profiles having an assigned unique internal control value. The method additionally comprises identifying, in the profile database, profiles meeting the received recipient criteria, generating a list of the assigned internal control values based on those profiles identified as meeting the received recipient criteria and having an assigned internal control value, and providing via the sender interface, wherein the assigned internal control values included in the list are anonymized. The method also comprises receiving the plurality of items, each item having printed thereon one of the assigned internal control values on the list, wherein the assigned internal control value is printed on the item in place of the physical address delivery point for the item. For each of the plurality of items, the method also comprises scanning, by item processing equipment, the item to read the internal control value printed thereon, identifying, in the profile database, the physical address delivery point corresponding to the assigned internal control value, routing, by the item processing equipment, the item according to the identified physical address delivery point, and delivering the item to the identified physical address delivery point.

In some embodiments, the method further comprises identifying a constraint associated with the received request, wherein the constraint limits the assigned internal control values that can be included in the list. In some embodiments, the method further comprises filtering the generated list based on the constraint and wherein the constraint limits the assigned internal control values based on one or more of a geographic area in which the item is to be delivered, a type of item on which the assigned internal control value can be applied, or a type of delivery point to which the item can be delivered. In some embodiments, the prefix code identifies to the item processing equipment how to identify the physical address delivery point for the corresponding assigned internal control value in the profile database. In some embodiments, the method further comprises identifying, in the request, a subject of interest to be shared by each delivery point, wherein the subject of interest relates to the plurality of items to be distributed and wherein identifying profiles in the profile database further comprises identifying profiles in the profile database that include the subject of interest and have an assigned unique internal control value. In some embodiments, the method further comprises encrypting the assigned internal control values included in the list before providing the list to the requesting entity. In some embodiment, the assigned internal control value is printed on each item as a computer readable code comprising one or more barcodes or barcode type images. In some embodiments, the method further comprises parsing the scanned computer readable code into the corresponding assigned internal control value. In some embodiments, providing the list to the requesting entity comprises providing instructions that cause the requesting entity to print each of the assigned internal control values on its own item.

Another aspect of the invention described herein includes a system for delivering items to a delivery point. The system comprises a profile database, a sender interface, at least one computer processor programmed based on instructions stored in a memory, and item processing equipment. The profile database stores a plurality of profiles comprising identified physical address delivery points. The sender interface receives a request for delivery point information for each of a plurality of items to be distributed, the request including recipient criteria. The at least one computer processor is programmed to assign, in the profile database, a unique internal control value to each profile having an identified physical address delivery point, wherein each unique internal control value has a character length equal to a character length of delivery point information printed on a physical distribution item and wherein each unique internal control value comprises a prefix code shared by multiple internal control values and a unique portion unique to the unique internal control value. The at least one computer processor is further programmed to identify, in the profile database, profiles having an assigned unique internal control value, identify, in the profile database, profiles meeting the received recipient criteria, generate a list of the assigned internal control values based on those profiles identified as meeting the received recipient criteria and having an assigned internal control value, provide, via the sender interface, wherein the assigned internal control values included in the list are anonymized, and receive the plurality of items, each item having printed thereon one of the assigned internal control values on the list, wherein the assigned internal control value is printed on the item in place of the physical address delivery point for the item. The item processing equipment configured to scan each item of the plurality of items. The at least one computer processor is further programmed to identify, in the profile database, the physical address delivery point corresponding to the assigned internal control value for each scanned item, route the item according to the identified physical address delivery point, and deliver the item to the identified physical address delivery point.

In some embodiments, the at least one computer processor is further programmed to identify a constraint associated with the received request, wherein the constraint limits the assigned internal control values that can be included in the list. In some embodiments, the at least one computer processor is further programmed to filter the generated list based on the constraint and wherein the constraint limits the assigned internal control values based on one or more of a geographic area in which the item is to be delivered, a type of item on which the assigned internal control value can be applied, or a type of delivery point to which the item can be delivered. In some embodiments, the prefix code identifies to the item processing equipment how to identify the physical address delivery point for the corresponding assigned internal control value in the profile database. In some embodiments, the at least one computer processor is further programmed to identify, in the request, a subject of interest to be shared by each delivery point, wherein the subject of interest relates to the plurality of items to be distributed and wherein identifying profiles in the profile database further comprises identifying profiles in the profile database that include the subject of interest and have an assigned unique internal control value. In some embodiments, the at least one computer processor is further programmed to encrypt the assigned internal control values included in the list before providing the list to the requesting entity. In some embodiments, the assigned internal control value is printed on each item as a computer readable code comprising one or more barcodes or barcode type images. In some embodiments, the at least one computer processor is further programmed to parse the scanned computer readable code into the corresponding assigned internal control value. In some embodiments, the at least one computer processor programmed provide the list to the requesting entity comprises the at least one computer processor programmed to provide instructions that cause the requesting entity to print each of the assigned internal control values on its own item.

Another aspect of the invention described herein includes a non-transitory, computer readable medium comprising instructions that, when performed by a hardware controller, cause a system comprising the hardware controller to assign, in a profile database, a unique internal control value to each profile having an identified physical address delivery point, wherein each unique internal control value has a character length equal to a character length of delivery point information printed on a physical distribution item, wherein each unique internal control value comprises a prefix code shared by multiple internal control values and a unique portion unique to the unique internal control value and receive, via a sender interface, a request for delivery point information for each of a plurality of items to be distributed, the request including recipient criteria. The instructions further cause the system to identify, in the profile database, profiles having an assigned unique internal control value, identify, in the profile database, profiles meeting the received recipient criteria, and generate a list of the assigned internal control values based on those profiles identified as meeting the received recipient criteria and having an assigned internal control value. The instructions also cause the system to provide via the sender interface, the generated list of assigned internal control values, wherein the assigned internal control values included in the list are anonymized, receive the plurality of items, each item having printed thereon one of the assigned internal control values on the list, wherein the assigned internal control value is printed on the item in place of the physical address delivery point for the item, and for each of the plurality of items: scan, by item processing equipment, the item to read the internal control value printed thereon, identify, in the profile database, the physical address delivery point corresponding to the assigned internal control value, route, by the item processing equipment, the item according to the identified physical address delivery point, and deliver the item to the identified physical address delivery point.

In some embodiments, the system comprising the hardware controller is further caused to identify, in the request, a subject of interest to be shared by each delivery point, wherein the subject of interest relates to the plurality of items to be distributed and wherein identifying profiles in the profile database further comprises identifying profiles in the profile database that include the subject of interest and have an assigned unique internal control value.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIG. 2 is a block diagram depicting one embodiment of an encrypted delivery point information system for acquisition, control, analysis, and distribution of recipient delivery point information.

FIG. 7 is a process flow diagram of a method for requesting and providing anonymous and/or encrypted delivery point information for an item and of processing and delivering the item to a recipient.

DETAILED DESCRIPTION

Figure 1:
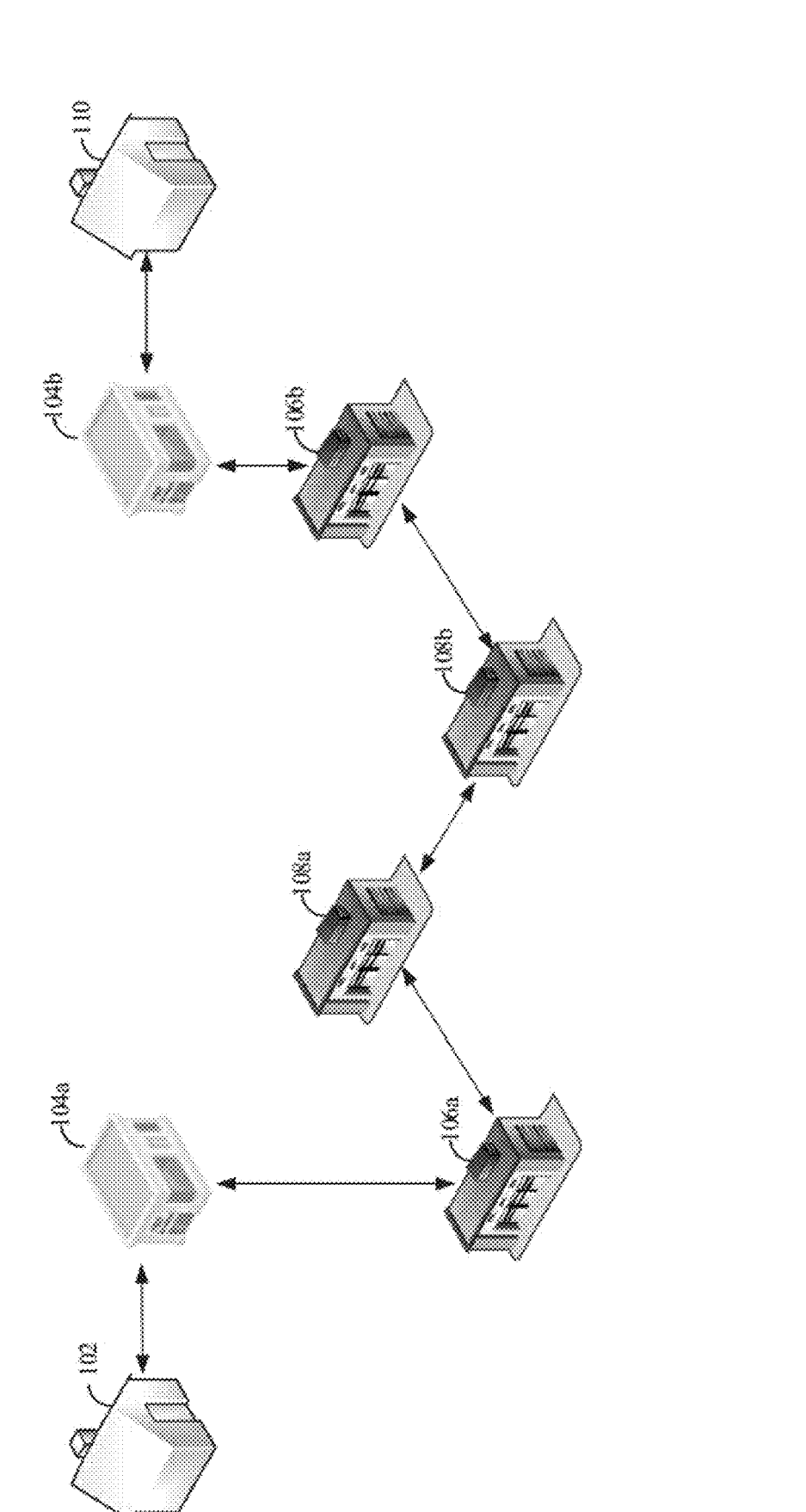
FIG. 1 is a diagram of an embodiment of a distribution system or network used to distribute items between shippers and recipients.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network. The term "distribution system" may correspond to a collection of components that form a distribution network, as operated by a distribution entity. Accordingly, the terms "distribution system," "distribution network," and "distribution entity" may be used interchangeably to refer to the same or similar components or entities.

Additionally, as used herein, the term "resident" may refer to any individual or entity that resides, works, visits, or is associated with a physical delivery point. For example, as used herein, a person at his or her office is a resident, as is a student or teacher at a school. As used herein, a resident can be an entity capable of sending items from a delivery point and receiving items at a delivery point. Additionally, the term "residence" may refer to any building having an assigned physical delivery point, such as a house, an office building, an apartment, a factory, a school, etc. As used herein, a residence can be any location capable of being a destination for items within the distribution network or it can be a return delivery point for items in the distribution network.

For example, a distribution system, such as the United States Postal Service (USPS), the United Parcel Service (UPS), Federal Express (FedEx), or other shipping or item delivery service, a warehouse, logistics company, item sorting systems, etc., may deliver items, such as letters, flats, parcels, packages, and bulky items to a plurality of delivery points or destinations. The USPS will be used in the present disclosure to describe some exemplary embodiments, but the present disclosure is not limited thereto. When referencing generically to any of the services listed above or any item distribution service in addition to those listed above, the phrase "item distribution service," "delivery service," or "distribution system" will be used to indicate such generalities.

A distribution network may comprise multiple levels. For example, a distribution network may comprise regional distribution facilities, hubs, and unit delivery facilities, or any other desired level. A nationwide distribution network, for example, may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the USPS, the unit delivery facility may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

A recipient, such as a postal customer, may select or provide delivery preferences to a distribution network, which include preferences for types of items to receive.

These preferences can be stored in a customer profile for each customer. The profile can store preferences for delivery, customer interests or categories of interests, permissions for gathering information and data, In some embodiments, a recipient can opt-in to a system for gathering preference information based on items delivered to the recipient. In some embodiments, the USPS can gather information regarding items received at a residence or by a resident through its distribution network. The USPS may also identify that a residence or more than one residence within a geographic area requests or receives specific periodicals, advertisements, deliveries, or other items. Additionally, since most items likely include a resident to which they are destined, the USPS may correlate the residence receiving a specific item with the resident that is identified as being the recipient of the item, when possible. Thus, the USPS may generate associations between residents and the residences to which the USPS delivers said items. The USPS wishes to protect the personal information of individuals and other entities to which the USPS delivers items. Thus, the USPS may not wish to simply provide personally identifiable information (PII) to shippers or other entities. To protect the PII of USPS customers, or of any distribution system, delivery point information can be anonymized and/or encrypted, as will be described below. In some embodiments, the anonymized and/or encrypted delivery point information can be stored in the customer profile, where only the USPS, or the distribution network systems, can access and read the anonymized and/or encrypted delivery point information. The anonymized and/or encrypted delivery point information can be associated in the profile with the actual delivery point, such as the address, of the customer.

In one aspect, the system and methods disclosed are configured to generate the anonymous delivery point identifier for the item and process items comprising encrypted delivery point information (such as address information) so that a sending or shipping entity or user able to have the item delivered to the recipient without the sending or shipping entity having actual knowledge of the delivery point associated with the recipient. In some embodiments, the recipient can establish, request, obtain, or be assigned delivery point information that does not directly indicate the physical address or actual geographic delivery location, such as a standard mailing address, but which is associated in a database or memory of the distribution network with the actual physical address or geographic delivery location. The delivery point information can be a permanent address, which the recipient does not need to change when, for example, the recipient moves to a new location, changes a name, etc. The recipient can simply inform the distribution network of the change in actual physical location, and the distribution network can change the association with the recipient's delivery point information.

The present disclosure relates to systems and methods for generating and distributing anonymized and/or encrypted recipient information to shippers and receiving, processing, and coordinating delivery of an item or a plurality of items to which encrypted recipient (address) information or delivery point information (e.g., a mailing address, GPS coordinates, grid coordinate, or any other location identifier) has been applied. The systems and methods disclosed herein are configured to generate the encrypted delivery point information for distribution to the shippers based on a request received from the shippers. The systems and methods disclosed are further configured to distribute the encrypted delivery point information to the shippers. The systems and methods disclosed are also configured to receive and distribute the item or items to which the encrypted delivery point information is applied to the proper recipient destinations as determined by the recipient information.

In some embodiments, a shipper may desire to send one or more items to a number of "unknown" recipients, where the unknown recipients may comprise potential customers, etc. with whom the shipper has had no previous communication. Accordingly, the shipper may not have names or delivery points of these potential customers, and may request that a distribution entity (e.g., an entity that operates a distribution system as described herein) provide the shipper with a list of names and corresponding delivery points to which the shipper will subsequently send one or more items. For example, the shipper may be a publisher of an outdoors themed magazine. Accordingly, the shipper may request 10,000 names and delivery points to which they intend to send offers, coupons, discount codes, marketing materials, etc.

In some embodiments, a shipper can select one or more categories and/or subcategories from the hierarchy of preferences. The distribution network can access the delivery points of customers who have selected preferences or categories similar to or the same as those requested by the shipper. The distribution network can produce the anonymous and/or encrypted identifiers and provide those to the shipper, as described herein.

In some embodiments, the shipper may request random names and delivery points. In some embodiments, the shipper can advantageously request delivery points of recipients the distribution system knows are interested in associated subjects, e.g., outdoors activities. Accordingly, the distribution system may identify and provide encrypted and/or e.g., anonymized delivery point information for 10,000 recipients, either at random or from a database of recipients and associated delivery point information. In some embodiments, the names may be provided without any encryption or anonymization, but the delivery point information may be encrypted and anonymized so that the shipper cannot easily identify physical delivery point information associated with each name, thus maintaining anonymity for the named recipients while allowing the shipper to communicate with them. In some embodiments, the distribution network supplies names, or does not supply names associated with the delivery point information.

Anonymizing delivery point information to shippers, mailers, and the like can prevent a shipper or mailer from determining the identity of individual recipients, but can provide the shippers or mailers more targeted opportunities for sending materials to recipients. In some embodiments, a recipient's participation in the encrypted (e.g., anonymized) program may utilize recipient opt-ins or may otherwise obtain permission from recipients for collection and use of information regarding mailing and receiving preferences. For example, the interest of the recipient may be gathered and analyzed by the distribution system without specific input from the recipient. Some examples of information collected to determine interests of the recipient may include item or package information, such as images of items received, characteristics of the items or packages received, such as size, weight, shape, etc., and sender or recipient information of items sent or received by the recipient. The distribution network can also use an opt-in preference collection system, such as via a user interface on a computing device, where recipients can provide personal or specific preferences about which types of distribution items recipients would like to receive and from which senders recipients would like to receive items. The opt-in system can also allow recipients to identify which types of items recipients would not like to receive, and from which senders recipients would not like to receive items. These preferences can be anonymized, aggregated, or otherwise combined within the distribution network and used with senders, vendors, or other entities who desire to send items to a targeted customer base or to customers who have selected preferences, which align with or are related to the business of the sender, vendor, etc.

In some embodiments, the customer can select from a supplied list of preferences for a category, such as sports, cars, outdoors, etc., or any other high level category. The customer can select subcategories within each category, such as golf, sports cars, fishing, etc. Further narrower or specific subcategories can be supplied to the subcategories in a hierarchical format. The customer can also apply or provide customized categories or preferences, which the distribution network can analyze and incorporate into the preferences hierarchy. The preferences hierarchy can also be provided to a sender, shipper, vendor, or entity that desires to send an item or items to customers with specific preferences.

Thus, in some embodiments, the distribution system described herein may request and acquire a general information disclosure opt-in system by which a resident, customer, and/or entity served by the distribution system may generally opt-in/opt-out of any disclosure or approval to provide and associate any information as discussed herein. In some embodiments, the opt-in system may request each resident or entity at a particular physical address or in the database to opt-in to (or out of) each type of information or each type of association (e.g., each association between a digital or electronic identifier and a physical delivery point) contained in a database maintained by the distribution system. Examples of opting-in may include residents or entities agreeing to allow the association of their e-mail address with their physical delivery point. In some embodiments, individual disclosure opt-in requests may be utilized for each association discussed above. In some embodiments, the resident or entity may be provided with an option to include or exclude certain associations and/or information, such as include the disclosure of an association with a particular e-mail address with the physical delivery point while excluding the association of the resident's or entity's Facebook® or Twitter®, or other social media handle, user name, and the like. Accordingly, the opt-in or permission system may offer a variety of customizable options for the customer or entity to selectively utilize.

Furthermore, the distribution system described herein as providing the delivery point and association information may utilize a household database that comprises the association information between residents or entities at a particular delivery point and any available digital or electronic identifiers (e.g., e-mail address, IP address, Twitter® identifier, Facebook® identifier, social media handle, etc.). The household database may be generated and maintained by various systems and methods. These systems and methods may generate and analyze a database comprising information regarding an item or plurality of items sent from and received by a particular delivery point or entity. This may include identifying physical attributes of the item or plurality of items being delivered and storing these attributes in the household database. In the household database, these physical attributes may be associated with one or more delivery points or names from which the item or plurality of items were sent and/or to which the item or plurality of items were or are being delivered.

Additionally, the household database may be used to store information regarding how many items, such as packages and similar articles, were sent or received by an address or entity and associated dates for said sending and receiving. For example, an address may receive four items in a span of three days, two of the items being packages and two of the items being letter size. The system or method may identify the letter size items as being cards based on identifying a card manufacturer logo on the envelope or based on the size of the letter size item. The packages may be identified by the system or method as being a gift based on wrapping paper or other physical markings on the packages.

In some embodiments, the system can identify items, including the packages and the letter size items using information encoded or embedded within a computer readable code located on the item, which can uniquely identify the item, a sender, an item type, and the like. This information may be entered into the household database and compared with information from a previous time period, such as a previous month or a previous holiday period. If a pattern of receiving increased amounts of items around a small range of dates is discovered, then the system or method may identify the range of dates as being a life event, such as a birthday or an anniversary. This identified life event may be used to identify potential services associated with the life event or the date. In order to accomplish efficient, practical, and usable analysis of entries in the database, the systems or methods may require real-time attribute identification and acquisition for each item in the distribution network, as well as immediate and real-time entry of acquired information into the database and analysis of the database entries associated with either or both of the sending and delivery addresses or entities.

Once the associations between resident names, delivery points, physical addresses, and unique digital identifiers are created and stored in the household database the household database may be configured to participate in an encrypted or anonymous delivery point information system as described herein. The associations contained in the household database may thus, as described herein, allow a shipper to send an item to a known or unknown recipient without actual knowledge of a delivery point for the recipient, such as the recipient's physical delivery point. In some embodiments, the terms encrypted and anonymous can be used interchangeably, that is, by encrypting a delivery point, the delivery point can be considered anonymous, since the delivery point cannot be identified or interpreted by the sender, or by any entity other than the distribution network who encrypted and can decrypt the information. In some embodiments, the delivery point can be anonymized and/or encrypted. For example, the delivery point can be given a random identifier, such as an alphanumeric identifier, computer readable code, or other identifier, which can be applied to the item. The delivery point would not be identifiable to any party by having the identifier, except the distribution network, which maintains a reference list or database associating the assigned random identifiers with delivery points. In this case, no encryption key would be needed to determine the actual delivery point based on the association. In some embodiments, anonymizing delivery points can include assigning a random identifier, and then encrypting the random identifier. This can enhance security and prevent senders from reverse engineering recipients' identities and delivery points.

In some embodiments, the delivery point information may be anonymized and/or encrypted to minimize the ability for the shipper to determine the recipient's actual physical delivery point information using the information that is the distribution system provides to the shipper. In some embodiments, the encrypted delivery point information may not be provided directly to the shipper but rather to a third party, that applies the encrypted delivery point information to the item destined for the recipient. In some embodiments, the encrypted delivery point information may include all the information needed for the item to be delivered to the appropriate recipient by the distribution system. As used herein, in the context of a distribution system such as the USPS, delivery points may be referred to interchangeably as addresses. A person of skill in the art will understand that the present disclosure is not limited only to addresses as delivery points, but that addresses are exemplary delivery points.

Many recipients or entities may desire to establish a permanent address, which does not change when the recipient or entity changes physical location. For example, a small business owner runs a business out of his or her home, but does not wish to give out his or her physical address to business contacts. The small business owner can register for a PO Box or can set up a virtual PO Box. The owner can provide the distribution network with the actual physical address to which items should be delivered, and the distribution network associates the actual physical address with the PO Box. Where the PO Box corresponds to an actual physical PO Box, the distribution network can also provide a user interface, which allows the small business owner to route items intended for the PO Box to be sent to the actual physical address of the small business owner. If the small business owner changes locations or moves the business, the small business owner does not need to update the address with multiple senders, e.g., banks, utilities, customers, and the like. The small business owner updates the physical address association with the PO Box, and the distribution network updates its systems to cause its processing equipment to route items having the PO Box address thereon for delivery to the actual physical address of the small business owner, based on the physical address provided by the small business owner. The term PO Box used here is exemplary only, and does not limit the disclosure. For example, instead of a virtual PO Box, a recipient could register an email address, a phone number, a social media handle, or any other alphanumeric identifier.

In some embodiments, an actual physical address can be associated with an email address, a username, a social media handle, a vanity address, etc., via an algorithm, such as a hash or cryptographic hash. For example, one or more controllers of the distribution system may use a hash or other algorithm to generate an internal control value. The internal control value can be associated with and/or stored in an account, for example, in the account of the recipient having the email address, a username, a social media handle, a vanity address, etc.

In some embodiments, the internal control value may have a length or include values that mimic one or more other codes or values used by the distribution system. For example, the internal control value may be assigned an 11-digit length that mimics a delivery point code for the delivery system, such as an 11 digit ZIP code, or a ZIP+4+2 code. Other lengths of values may be used. By assigning the recipient to the internal control value at the account level, the internal control value is associated with any contact information, etc., that is associated with the recipient, and when the account holder changes physical address, or changes the virtual address, the internal control value need not be updated or changed. By enabling the internal control value to mimic length and features of other codes or values that are recognized by the distribution system, the distribution system may recognize the internal control value when placed on or associated with an item handled by the distribution system and maintain existing methods and systems for handling the item. For example, when the internal control value mimics the 11-digit ZIP code, then the same equipment that is able to scan and parse the 11-digit ZIP code will instead and/or also be able to scan and parse the internal control value, thereby enabling the equipment to utilize the internal control value in place of the 11-digit ZIP code in this example.

The internal control value can start with a prefix, which indicates to item processing equipment that the code is an informed address or intelligent address item, and that the actual physical address may need to be identified from a database. In some embodiments, the prefix can be, for example, 002 or 201. In some embodiments, the prefix can be used to identify profiles in a profile database based on the internal control value. For example, when the 002 prefix indicates that the internal control value relates to an informed address item, then the distribution system 100 (for via the item processing equipment) may determine that the corresponding delivery point information is stored in an informed addressing database or portion of the profile database. Thus, the prefix of the internal control value can be used to enable the distribution system 100 to more efficiently identify the corresponding physical address for the internal control value by directing the distribution system 100 where to identify the internal control value in the profile database, which can increase efficiencies and decrease computation requirements. In some embodiments, the prefix can identify a constraint on the item to which the internal control value can be applied. For example, the prefix can identify that the internal control value is encrypted, or a type of item. In some embodiments, the internal control value may only be placed on particular types of items (for example, envelopes, flyers, magazines, and so forth), on items destined for a particular geographical area (for example, a state, a metro area, and the like), and/or items destined for a particular type of delivery point (for example, apartment complexes, single family homes, commercial buildings, and the like).

By using an 11-digit value as the internal control value, up to 99,999,999 unique values can be assigned, for example, for or within the 002 or any other three-digit prefix. With so many values available, accounts that are assigned one of the internal control values may not need to have a new internal control value assigned to it, regardless of other associated changes (for example, a change to the corresponding recipient's address). However, new internal control values may be assigned or expire on a rotating basis to further discourage reverse engineering of the internal control values by third parties. Furthermore, the 11-digit internal control value may be used to enable direct item correspondence between mailers and recipients via the distribution system 100 without the distribution system 100 having to provide PII regarding recipients to the mailers. Instead, the distribution system 100 can provide the mailer with a number of randomly assigned 11-digit internal control values that only the distribution system 100 knows how to decode to a particular physical delivery point.

In some embodiments, the distribution system may generate a hash table that validates that particular virtual address information (for example, the virtual PO box, email address, phone number, social media handle, and so forth) can be converted into a physical address enabling item delivery. In some embodiments, by maintaining an association between the recipient's account and the internal control value, an item for delivery by the distribution system may be delivered to a particular destination address when the item includes a barcode or other information in the recipient's account. In some embodiments, the distribution system may apply the barcode or the internal control value to the item being delivered.

For example, if the distribution system receives an item including a barcode or other information corresponding to the internal control value. In some embodiments, the barcode or other information may include a flag or other indicator that indicates to the distribution system that the barcode or other information is associated with a recipient's account. The distribution system may translate the barcode or other information to identify a delivery point code associated with the recipient's physical address. In some embodiments, the distribution system adds the delivery point code to the item based on the translation of the barcode or other information, by, for example, spraying or printing the actual address, or a code indicative (not encrypted) of the delivery point on to the item.

In some embodiments, such a system may enable validation of virtual data and/or addresses added to items for delivery that can be delivered physically without exposing the relationship between the virtual address account information associated with the physical address for delivery. Additionally, the relationships in the recipient account can be easily changed without reducing function within the distribution system. In some embodiments, the internal control value may not be limited to an 11-digit value, but instead could include any number or sequence of alphanumeric values, for example, a seventeen character alphanumeric value or code.

In some embodiments, the value or code may be processed (for example, for an item handled by the distribution system) to identify one or more delivery points and/or cues to enable delivery of the item that does not include any identifying information. The distribution system may use the value or code to identify and apply a corresponding barcode or other delivery point information to the item.

As an example, a customer with an address of 512 Main Street address in Collierville Tennessee, ZIP code 38017-1705, can register the address. The system can assign an internal control value of 00299123412 based on the known delivery point, using a hash or other function or algorithm to convert from an 11-digit ZIP code to the internal control value. In some embodiments, the internal control value obtained from the 11-digit ZIP code can be associated with email addresses, virtual addresses, handles, etc., registered by the user or recipient residing at 512 main street. In some embodiments, the internal control number can be obtained using an algorithm or function to convert email addresses, virtual addresses, handles, etc., registered by the user or recipient residing at 512 main street.

A hash table product or service is provided to item senders, such as mailers, or other parties. A sending party can query a database using an email address, username, etc. for a recipient. The system can identify the inputted email address etc., and can provide the internal control value. The internal control value is hashed, or otherwise operated on such that it cannot be used to find the actual delivery point or delivery point code for the recipient at 512 main street. Thus, the sender does not know the actual address of the recipient. When the item processing equipment receives an item with 00299123412 thereon, the system identifies the 002 prefix and searches a database to find the actual delivery point code associated with the item control value, or can run a decryption algorithm to identify the delivery point code whose hash resulted in the item control value. In this case, the system finds that the delivery point code 38017170512 is associated with the item control value 00299123412. The item processing equipment can spray the delivery point code or a new barcode to the item, such that the item processing equipment need not perform the look up or decryption algorithm for each scan or event on item processing equipment in the distribution network. Thus, by replacing delivery point information with the internal control values for distribution to the mailers, items mailed by the mailers may be easily distributed by the distribution system 100. Furthermore, mailers can validate legitimate address information (for example, email addresses, a username, a social media handle, a vanity address, and the like) on items that can be delivered physically, the distribution system 100 does not expose customer address information, and the distribution system 100 can under normal procedures, with an addition of a directory lookup step and printing of new barcodes on corresponding items.

In some embodiments, different stages or phases of encryption or hashing may be applied to items with respect to identifying delivery points for the items. In some embodiments, in a first stage, the encrypted or hashed code (which may also be or referred to as the internal control value) identifying the delivery point for the item includes city, state, and/or ZIP code information for the delivery point but encrypts the street address information in an alphanumeric, graphic, or bar code. For example, the delivery point code 38017170512 introduced above may be encrypted or hashed to generate the internal control value. Alternatively, or additionally, the distribution system 100 may encrypt or hash the internal control value 00299123412 introduced above. In some embodiments, the internal control value includes a value or indicator indicating that the internal control value represents the street address portion of the delivery point but not the city, state, and/or ZIP code information for the delivery point. For example, in the first stage, an item having a delivery point of 49 Main Street, Apartment 34 in Arlington, VA with ZIP 22005 may have printed thereon includes the internal control value of 99*49 AQ2172400 34 (which may be optionally encrypted). This code can be applied to the mail items destined for the 701 Main Street, Apartment 34 delivery point, thereby replacing street address based delivery point information with information only identifiable or able to be parsed by the distribution system 100. Thus the street address based delivery point information, even if not specifically encrypted, may effectively become encrypted when replaced with the internal control value specific to and associated with the corresponding delivery point information. In some embodiments, the code 99*49 AQ2172400 34 represents and/or replaces the 11-digit ZIP code for the item introduced above.

The internal control value may include various parts or components. For example, the "99" in this internal control value may represent an identifier to the distribution system 100 that indicates that any item including a code that begins with this value (here, "99" or "99*") is a special item and should be processed in a particular way. For example, the code 99 may indicate that the item should be processed by equipment capable of parsing the internal control value and accessing necessary databases and/or information to identify the corresponding delivery point code. The "49" value following the "*" may represent a house number, which may be a house number on a particular route (for example, this item would be delivered to the 49th house on the particular route) or may be a street address house number (for example, representing the "49" of the address 49 Main Street). In some embodiments, the "*" merely represents a divider between information fields or may be included as part of either the special piece code or the house number code. These characters can be machine readable by sorting equipment, and using the house number in the code can be human readable to provide indications to a delivery resource, such as a mail carrier, to which delivery point the item should be delivered.

The next nine characters ("AQZ172400") may represent the delivery point code for the item. These nine characters may be any alphanumeric value, meaning that for each character, 36 possible values exist, for a total 101,559,956, 668,416 unique delivery point codes can be represented by these characters. Alternatively, only the initial three characters "AQZ" can be alphanumeric values, meaning that the unique internal control value can represent 46,656,000,000 unique delivery point codes. In some embodiments, with so many unique values represented by the internal control value, each internal control value can be assigned to a single individual and not just an individual delivery point code. The final "34" of the internal control value may represent the apartment number, Apartment 34 in the example above. In some embodiments, this value can be human readable and enables the carrier to easily identify which particular delivery point the internal control value applies to. For example, the 9-character value AQZ172400 may represent a delivery code for an apartment building and the "34" may indicate to the carrier which particular unit in the apartment building receives the item.

Alternatively or additionally, the 99*49, may indicate that the internal control value is encrypted and how the internal control value is encrypted (for example, in what particular way or with what particular encryption or hash key). One or more portions of the code may represent the ZIP code for the delivery point and/or unit information that is part of the delivery point. To enable successful delivery of an item having the code for its delivery point, the code may be linked to a corresponding recipient's profile and delivery point in an internal database of the distribution system 100. The distribution system 100 is then able to provide items with the corresponding codes for recipients, allowing mailers to mail items to the consumers without knowing the consumers' physical address and allowing the distribution system 100 to protect identities of its consumers. Once the item enters the item stream of the distribution system 100, the code (which has been applied to the items in place of the street address delivery point information) is processed using backend systems that resolve the code to the actual street address delivery point and enables delivery of the item.

In some embodiments, the internal control value is applied to items in different stages with different information. For example, in a first stage, the internal control value is placed on items along with corresponding city, state, and ZIP code information of the delivery point. In a second stage, the internal control value can replace the city, state, and ZIP code information along with the street address delivery point code information. In a third stage, the internal control value can be applied as a printed barcode or similar computer readable code to further obfuscate the delivery point information from the mailers, thereby replacing the street address information and the city, state, and ZIP code information. In some instances, the internal control value is also indicative of postage payment, as described below. Additionally, the internal control value can include information regarding a barcode type for the item and a service type for the item.

In some embodiments, the internal control values described herein can be used in conjunction with informed delivery and offer based items. As informed delivery and offers can apply to any of mail items, flats, magazines, packages, and parcels. When the delivery item is a package or parcel, the sender can receive interaction information for the item and supplemental content associated with the package or parcel. For example, the sender can include a return authorization in the supplemental content or other information relevant to sender transaction, such as feedback or review content, order and/or invoicing information, and so forth. When a recipient of the physical item receives a notification that the package or parcel is to be delivered, the supplemental content provided with the notification can include a link to a returns, feedback, billing, and/or similar portal provided either by the distribution network 110, by the sender, and/or by a third party. In some embodiments, the notification can include a link to an online catalog, a website for the sender, or any other desired content. In some embodiments, the notification can also include links to instructions, instructional videos, accessories, and so forth.

In some embodiments, the distribution network 100 can have an Artificial Intelligence (AI) architecture to support capabilities within the distribution network 100 relating to mining the extensive item tracking data and identifying trends, anomalies, and other potential issues. The AI architecture can support the following capabilities: to classify requests and predict outcomes, for example, to identify packages at risk; to run multiple models to determine the best possible answer to customer and system queries such as combining outcomes from package history, weather data, facility closures, etc.; to interface with back-end systems, for example to be able to open a ticket when the AI detects an issue which requires or may require human intervention; and to augment human problem resolution, for example to identify changes in the current state of a package's delivery such as identifying a relevant new scan event from the data in the distribution network.

In some embodiments, a recipient or sender can request a one-time code or one-time identifier for use with the distribution system. For example, if a recipient is ordering something online, or from a catalog, etc., the recipient can request that the distribution network provide a single use delivery code, or a delivery code that is valid for a short period of time. The single use delivery code can be anonymized to the sender, and will be associated with the recipient's actual delivery point or address. The recipient or sender will register the actual physical address or delivery point with the single use or limited-time use code and the distribution network stores an association between the single use code and the actual physical address or delivery point. The recipient or sender puts the single use or limited-time use code, for example, as an alphanumeric code or a computer readable code, on the item to be shipped. When the distribution network processing equipment scans the item having the single use or limited-time code, the processing equipment queries the database based on the code and receives instructions for routing the item for delivery to the actual physical address associated with the single use or limited-time code. Postage payment and indications can also be stored in a database and be associated with the single use or limited-time code, for example, when each character in the entire "AQZ172400" portion can be alphanumeric values. Alternatively, a single character having a particular value in this code can be indicative of the postage having been paid (for example, any of the "99", "*", and "AQZ172400"). A sender or recipient will not need to print out a label or put return or mailing addresses on items, and the sender or recipient address can remain anonymous. In some embodiments, the processing equipment can decode the single use or limited-time code, in the case where it is encrypted. In some embodiments, the processing equipment can spray, print, or label the item with a human readable address, for example, one that is understandable to an item carrier or deliverer. In some embodiments, a carrier on a route to deliver an item can scan or enter the internal control value indicated printed on the item into the carrier's mobile delivery device, (for example, as a barcode or character code). The mobile delivery device can communicate with a server to receive the delivery point information or address, in a standard address format or other human readable format, to allow the carrier to read the delivery point, address, or other information for the item having the code thereon.

In some embodiments, the distribution network can assign delivery point information, delivery codes, such as single use or limited-time codes for items in a dynamic warehousing scenario, which will be described in greater detail below.

FIG. 1 depicts a diagram of one embodiment of a distribution system 100 used to distribute items between shippers 102 and recipients 110. The distribution system 100 may be employed by an item delivery service to distribute items received and to be delivered across a geographic area. The distribution system 100 shows various distribution points or facilities. In some embodiments, the distribution system 100 may include more or fewer distribution points or facilities than shown in distribution system 100. For example, the distribution system 100 includes unit delivery facilities 104a and 104b (e.g., post offices or drop-off locations). The distribution system 100 may also include semi-regional facilities 106a and 106b (e.g., sectional center facilities) and regional facilities 108a and 108b (e.g., network distribution centers or distribution hubs).

The unit delivery facilities 104a and 104b may correspond to a facility that receives, sorts, and delivers items destined to recipients within a given geographic area. In the case of the USPS, the unit delivery facilities 104a and 104b may be associated with a region covered by a ZIP Code™ (a trademark of the USPS) or a regional collection of ZIP Codes™. In this role, the unit delivery facilities 104a and 104b may receive items from the semi-regional facility 106a that serves it. These items received from the semi-regional facilities 106a and 106b may be delivered by the unit delivery facilities 104a and 104b (e.g., via a mail carrier route, etc.) to the appropriate destination within its covered geographic area. Accordingly, the unit delivery facilities 104a and 104b may also sort and stage the items intended for delivery to destinations/recipients within the delivery unit's coverage area.

The unit delivery facilities 104a and 104b may also serve to induct items into the distribution system 100. When serving as an intake facility, items that are inducted at the unit delivery facilities 104a, 104b into the distribution system 100 may be sent to the semi-regional facilities 106a and 106b. In some embodiments, the unit delivery facilities and 104b may receive items from local shippers, from semi-regional facilities 106a and 106b, or regional facilities 108a and 108b. While the delivery unit 104a is shown as the intake facility, any of the semi-regional and regional facilities 106a and 106b and 108a and 108b, respectively, or other facilities not shown, may serve as the intake facility.

The semi-regional facilities 106a and 106b may receive and distribute items between multiple unit delivery facilities and 104b and the associated regional facilities 108a and 108b. In the case of the USPS, the semi-regional facilities

106a and 106b may each be associated with a geographic region covered by the first three numbers of a ZIP code. The semi-regional facility 106a may serve as a processing and distribution center for the respective multiple unit delivery facilities and 104b within its respective geographic areas. In some embodiments, the semi-regional facility 106a may receive items from the regional facility 108a for distribution to its respective delivery unit 104a. In some embodiments, the semi-regional facility 106a may receive items from its delivery unit 104a, for distribution to other delivery units 104b or the regional facility 108a.

The regional facilities 108a and 108b may receive and distribute items between multiple semi-regional facilities 106a and 106b and other regional facilities. In the case of the USPS, the regional facility 108a may be associated with a region covered by a state or a group of states, etc. The regional facilities 108a and 108b may serve as processing and distribution centers for the respective multiple semi-regional facilities 106a and 106b within their respective geographic areas. In some embodiments, the regional facility 108a may receive items from the semi-regional facility 106a for distribution another semi-regional facility 106b that the regional facility 108a serves. In some embodiments, the regional facility 108a may receive items from its semi-regional facilities 106a and 106b for distribution to other regional facilities, e.g., the regional facility 108b.

When the item enters the distribution system 100 at the intake facility (e.g., regardless of delivery unit 104a, semi-regional facility 106a, and regional facility 108a), the item may be tracked through all sortation and distribution steps through which the item may pass. In some embodiments, such tracking may be individual to the item or be aggregate for volumes of items. The tracking may occur until the item is delivered to its destined recipient or until the item leaves a delivery unit 104b for delivery to its destined recipient.

In some embodiments, the distribution system 100, as shown, may be a national distribution network that comprises multiple regional facilities 108a and 108b, multiple semi-regional facilities 106a and 106b, and multiple unit delivery facilities 104a and 104b, each having a defined coverage area, such as a geographic area and designated to receive and/or delivery items to/from recipients and senders in the geographic area. It will be understood that the distribution system 100 depicted in FIG. 1 is exemplary only, and the present disclosure is not limited to the particular distribution system 100, but can comprise more or fewer components.

As described herein, the distribution system 100 employed may comprise numerous pieces of mail processing equipment located in various facilities and at each level within the distribution system 100 (described and undescribed) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment identify delivery point information that is located on the items being processed and reference stored information associated with the identified delivery point information to assist in the sorting and routing of the item.

Alternatively, or additionally, these pieces of equipment may identify recipient delivery point information and sort and route the item based on the identified recipient delivery point information. In some embodiments, different items being routed between the same locations may be routed differently based on a class of service, type of the item, postage of the item, size of the item, etc. For example, a first letter shipped from San Diego, CA, to Washington, D.C., with first class postage may be routed differently than a large package shipped between the two locations. Similarly, a second letter shipped with next day postage may be routed differently than the first letter shipped with first class postage. The variety of potential routes for different types of items or different postage services indicates the benefit of distributing a system throughout the distribution network, for example in multiple intake and unit delivery facilities, to maximize the amount of information gathered by the system to associate with residences and delivery points.

FIG. 2 depicts a block diagram of one embodiment of a delivery point information system 200 for acquisition, control, analysis, and distribution of encrypted and/or anonymized recipient delivery point information. The delivery point information system 200 comprises a processor 210, a memory 215, an encryption/decryption module 220, a communication module 225, one or more commercial interfaces 230, item processing equipment 235, a mobile computing device 240, and an authentication module 245. In some embodiments, the delivery point information system 200 may comprise more or fewer components than shown in FIG. 2, or one or more of the components may be combined with one or more other components.

In some embodiments, the delivery point information system 200 may be a distributed system. For example, the delivery point information system 200 may comprise one or more components that are centralized (e.g., the processor 210, the memory 215, the communication module 225, the encryption decryption module 220, the authentication module 245, and the commercial interfaces 230) with other components distributed in various locations, where all of the components are interconnected, for example, via the communication modules 225. In some embodiments, more or fewer components may be distributed and/or centralized. When in a distributed system with centralized components, the centralized components may be configured to interact and communicate with the distributed components. For example, a geographic region or distribution facility may comprise a collection of mobile computing devices 240 or item processing equipment 235 that are each distributed and that each communicate with the central components (e.g., the processor 210, the memory 215, the communication module 225, or encryption/decryption modules 220). Accordingly, when decrypting encrypted delivery point information, the distributed system 100 may funnel all decrypting functions to the centrally located encryption/decryption module 220.

In some embodiments, each piece of equipment that handles an item in the distribution system 100 may comprise each of the components shown in FIG. 2. Accordingly, when decrypting encrypted delivery point information, the item processing equipment 235 may locally perform all decrypting functions with a built-in encryption/decryption module 220 on the local processing equipment, or within the facility housing the item processing equipment 235.

For ease of discussion herein, the delivery point information system 200 will be described as a centralized system with various component integrated with the delivery unit 104 as described herein. Accordingly, delivery facilities may have their own delivery point information systems 200, where the individual memory 215 and processor 210 for each system corresponds to the specified geographic regions. In some embodiments, the multiple delivery point information systems 200 each comprising processors 210 may share a single memory 215. In some embodiments, the multiple delivery point information systems 200 each have individual memory 215 but all share a single processor 210. In some embodiments, the multiple delivery point information systems 200 each have individual memory 215 and individual processors but are still interconnected via one or more communications modules 225.

The processor 210 can be embodied on a computer or a server, which communicates via wired or wireless link to the memory and modules of the delivery point information system 200. In some embodiments, all processing for the various modules of the delivery point information system 200 may be performed by the processor 210. In some embodiments, the processor 210 may comprise the processor of a piece of item processing equipment 235 or a computing device. Accordingly, the processor 210 may be integrated within the equipment or device and may not perform or control any distributed functions or processing. Accordingly, each individual piece of equipment or device may perform any necessary decrypting or encrypting processes locally. In some embodiments, the processor 210 may be configured to process information received from any of the components to which it is coupled. In some embodiments, the processor 210 may run software or programs stored in the memory 215 or received from any of the components of the delivery point information system 200.

The memory 215 is in communication with the processor 210, and (via the processor 210) the communication module 225, the authentication module 245, the commercial interfaces 230, the mobile computing device 240, and the item processing equipment 235. The memory 215 can store data and information, such as in the household database, a relational database, or in any other information storage format, such as comma delimited, etc. In some embodiments, the memory 215 may include a database of delivery point information, such as address information, and a database of encryption and decryption protocols or standards. In some embodiments, the memory 215 may also include a database of relationships between encryption/decryption protocols and delivery points and/or customers. The memory 215 can also store the operating instructions for the components of the delivery point information system 200. In some embodiments, the memory 215 may comprise an individual computing system configured to store information, the computing system having its own processor and communication modules. In some embodiments, the memory 215 may be a local memory of the item processing equipment 235 or the mobile computing device 240. When the memory 215 is local to the item processing equipment 235 or the mobile computing device 240, the memory 215 may store operating instructions for the equipment or computing device and/or may store encryption and decryption information for use by the encryption decryption module 220 and/or the processor 210 in a localized manner.

The commercial interface 230 may comprise an interface through which users (e.g., customers, third party shippers, etc.) can request anonymized delivery point information and/or encrypted delivery point information for recipients, manage existing requests, receive computer readable codes from the distribution system, and view results from previous requests. In some embodiments, the commercial interface 230 may comprise a computer system, a processor, software running on the processor 210, a website or portal operated by an external system, an application, user interface, and the like. In some embodiments, the commercial interface 230 may be integrated with one or more other modules of the delivery point information system 200, such as the authentication module 245 or the memory 215 or the processor

210. In some embodiments, the commercial interface 230 may allow the user to view and manage various parameters for their request of encrypted delivery point information. For example, the request may include a number of requested names and delivery points, a duration for which the encrypted delivery points will be useable with the distribution network, and any additional information associated with the request (e.g., corresponding interests of the recipients, etc.). In response to the request for the encrypted delivery point information, the processor 210 may access the memory 215 (e.g., the household database) to identify the number of requested recipient names and delivery points. In some embodiments, the identified recipient names and delivery points may be stored in a temporary database or storage file before they are made available to the commercial interface 230 for management or viewing.

The encryption/decryption module 220 may comprise one or more encryption modules and decryption modules. In some embodiments, the encryption module may encrypt the delivery points of the identified names so that the user or shipper requesting the names and delivery points is unable to identify an actual physical delivery point corresponding to a recipient's name from the information the distribution service supplies in response to the user's or shipper's request. Thus, only the delivery point information system 200 is able to associate the encrypted delivery point information with the proper delivery point for delivery. The encryption/decryption module 220 may utilize one or more algorithms, keys, etc. The encryption/decryption module 220 may change algorithms, keys, etc., randomly or on a periodic basis in order to obscure the user's ability to reverse engineer delivery points corresponding to names of recipients.

In some embodiments, the encryption/decryption module 220 may use different algorithms or keys for different users in order to add an additional layer of complexity to the encryption/decryption process. These encryption procedures may protect the privacy of the recipients whose encrypted delivery point information the delivery point information system 200 provides to the user. Accordingly, the user may not repeatedly send mailings to the recipients on a list of encrypted recipient information over an extended period of time without requesting updated information from the delivery point information system 200.

The communication module 225 comprises a module that allows any component of the delivery point information system 200 to communicate with one or more devices and modules external to the delivery point information system 200. For example, the communication module 225 may provide wireless or wired communication capabilities with a communication module 225 of another delivery point information system 200 or with the user described herein. The communications with the user may be via the Internet or a similar network type connection. The communication module 225 may receive communications from users, for example, requests and queries for analysis of the anonymous delivery point identifier. The communication module 225 may also transmit the results of the requests and queries for analysis to the requesting user. In some embodiments, for example when one or more of the components of the system are distributed, the communication module 225 may also communicate with other components of the delivery point information system 200. For example, when the encryption/decryptions functions of the delivery point information system 200 are centralized separate from the processor and/or memory, then communication modules 225 may allow for communication between the remote components.

Similarly, communication modules 225 may provide for communication between any other components that are remote from each other. Accordingly, the communication module 225 may be configured to provide communications for each of the components of the delivery point information system 200. The communication module 225 may also be configured to allow the modules of the delivery point information system 200 to access external resources, such as the Internet or a local network, etc.

The item processing equipment 235 may comprise equipment that the delivery point information system 200 uses to scan, identify, sort, route, and otherwise distribute items from their respective sources to their respective destinations or recipients. In some embodiments, the item processing equipment 235 may comprise sensors, cameras, and a computer or a processor or software running on the processor 210, or the like. Using its various sensors, the item processing equipment 235 may identify encrypted delivery point information on an item being handled by the item processing equipment 235 and request that the encryption/decryption module 220 decrypt the encrypted delivery point information so that the item processing equipment may properly sort or route the item.

In some embodiments, the item processing equipment 235 may be integrated with one or more other components of the delivery point information system 200. The item processing equipment 235 may be configured to receive one or more signals from one or more sensors, cameras, connections with sensors or connections with cameras or other input devices configured to identify and capture physical attributes of the item. The signals received by the item processing equipment 235 may include inputs or signals comprising, for example, scans and/or OCR of written or printed delivery point information, scans of barcodes (e.g., an Intelligent Mail Barcode® (IMb™, a trademark of the USPS)) that is printed on the item, a mass or weight of the item, dimensions of the item, shape of the item, or physical markings on the item (such as a logo or description of the contents or a decorative bow or wrapping paper or infrared (or other non-visible) markings). In some embodiments, the item processing equipment 235 may be configured to communicate the received inputs or signals to any of the other components of the delivery point information system 200.

The one or more mobile computing devices 240 may comprise a mobile device (for example, a cell phone or a PDA), a computer, a processor, software running on the processor 210, or the like. In some embodiments, the one or more mobile computing devices 240 may be integrated with one or more other modules of the delivery point information system 200. The one or more mobile computing devices 240 may represent input mechanisms or modules allowing the mail carrier handling the item to provide input to the delivery point information system 200. In some embodiments, the one or more mobile computing devices 240 may include a camera or other image or multimedia capturing functionality (e.g., barcode capture capability) such that a carrier manually handling the item comprising the encrypted delivery point information may be able to access the unencrypted delivery point information via the encryption/decryption module 220. In some embodiments, the mobile computing devices 240 may further include text input capabilities (such as a physical or touchscreen keyboard), such that the carrier may input descriptions or various text phrases into the delivery point information system 200. In some embodiments, the mobile computing device 240 may comprise multiple pieces of hardware (for example a camera and a PDA) or may be integrated into a single piece of hardware (for example, a smartphone, a tablet, a computer, a mobile delivery device (MDD) (for example, the mobile computing device 240) or a tablet computer, etc.).

The item processing equipment 235 and the mobile computing device 240 can communicate with the processor 210 via the encryption/decryption module 220 in the case of encrypted delivery codes, or where encryption/decryption is not desired or required, the item processing equipment 235 and the mobile computing device 240 can communicate with the processor 210 bypassing or not using the encryption/ decryption module 220.

The authentication module 245 may authenticate users who request anonymous recipient delivery point information via the delivery point information system 200. For example, the delivery point information system 200 may only provide the anonymous delivery point identifier to users who have registered and provided specified information to the delivery point information system 200 (e.g., name, address, contact information, etc.). The authentication module 245 may authenticate users via any known means, for example, user names and passwords, randomized unique identifiers, etc. Once the use is authenticated by the authentication module 245 (for example, via the commercial interface 230), the user may be allowed to request, manage, or view anonymous delivery point identifier.

In some embodiments, the delivery point information system 200 may be implemented or incorporated at one or more levels of the distribution system 100 described herein, such as in the delivery unit 104, the semi-regional facility 106, or the regional facility 108. In some embodiments, various equipment from any of these facilities may comprise the item processing equipment 235. In some embodiments, equipment from the facilities may be coupled to and/or integrated with the delivery point information system 200. For example, routing and sorting equipment at any of the distribution points of the distribution system 100 may communicate or be integrated with the anonymized information system when routing or sorting items that include encrypted or anonymized information. Alternatively, or additionally, the intake facilities may communicate or be integrated with the delivery point information system 200 to route and sort items that they intake that may include encrypted or anonymized information. In some embodiments, one or more pieces of the sorting and routing equipment may comprise one or more components of the delivery point information system 200 (e.g., the encryption/decryption module 220, the memory 215, and the processor 210) so that encrypted delivery point information can be decrypted locally without any need for external communications.

Figure 3:
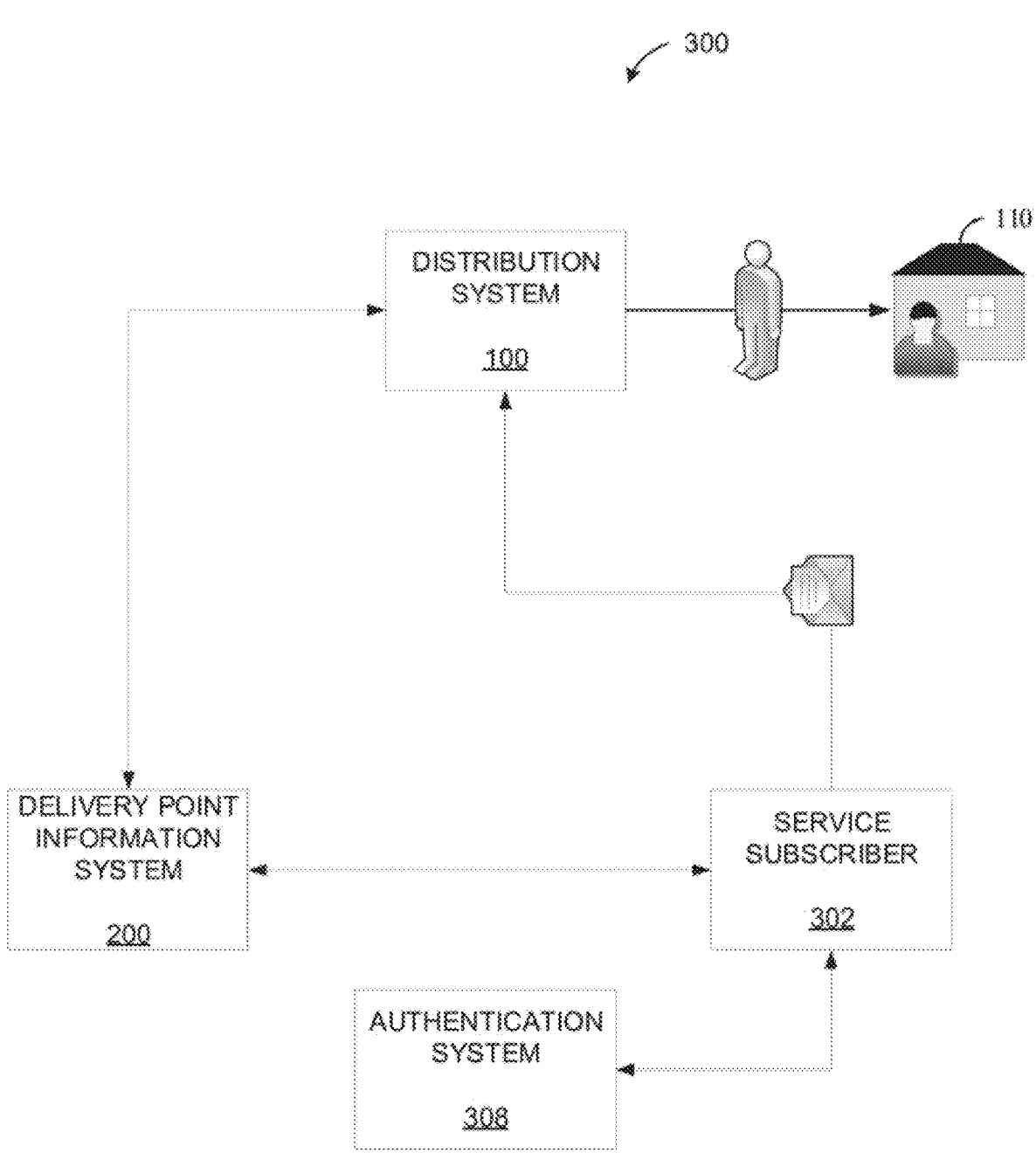
FIG. 3 is a graphical flow chart of the distribution system of FIG. 1 as integrated with the encrypted delivery point information system of FIG. 2 to create an anonymized shipping system for use by a subscriber.

FIG. 3 depicts a graphical flow chart of the distribution system 100 integrated with the delivery point information system 200 of FIG. 2 to create an anonymous and/or encrypted shipping system 300 for use by a service subscriber 302 to send items to recipients 110. As shown, the service subscriber 302 (e.g., shipper, customer, recipient, user, etc.) communicates with the delivery point information system 200. The subscriber 302 communicates with the delivery point information system 200 via a commercial interface 230, such as via a website, an application, an API, a portal, and the like. The subscriber 302 also provides items having anonymous or encrypted delivery point information applied thereon to the distribution system 100 or is the intended recipient of items. The distribution system 100 communicates with the delivery point information system 200 to identify physical delivery points associated with the anonymous or encrypted delivery point information applied to received items, and routes the items to carriers that distribute the items to the intended recipients.

In function, the subscriber 302 may submit a request to the delivery point information system 200 to obtain and/or request anonymous delivery point identifier. The subscriber 302 can be a shipper, a recipient who wishes to have an anonymous address, a single use or limited-time code. The request may be submitted after the subscriber 302 is authenticated by the authentication system 308. In some embodiments, the authentication system 308 may be integrated with the delivery point information system 200. In some embodiments, the encrypted delivery point information may comprise recipient name and delivery point information. For example, the subscriber 302 may request a list of a plurality of recipients at random or corresponding to a given geographic region, subject of interest, social or financial class, etc. In some embodiments, the request may be via an application program interface (API) where the delivery point information system 200 comprises an aggregate data set or database. In response to the request, the delivery point information system 200 may provide the requested list. In some embodiments, the response may include a rejection to the request with a reason for the rejection, such as an invalid request or a request that exceeds the information to which the subscriber has access, or lack of information in the delivery point information system 200 to provide the requested list, etc.

In some embodiments, the subscriber 302 can request an anonymous address be assigned to the subscriber's physical address. In some embodiments, the subscriber 302 can request a single use code or a limited-time code. The subscriber 302 provides subscriber information via the interface to the delivery point information system 200. For example, the subscriber 302 can request an anonymous address and provide subscriber information, such as physical address, contact information, payment information and the like. If the subscriber's 302 actual physical address is 123 Main Street, the subscriber 302 provides this information to the delivery point information system 200. The delivery point information system 200 can then provide an anonymous address. The anonymous address can be an alphanumeric code, a computer readable code, or both. The delivery point information system 200 can also allow the subscriber 302 to provide the anonymous address, such as an email address, a unique alphanumeric string, and the like. As an example, the delivery point information system 200 may assign the anonymous address "IA1234". The delivery point information system 200 stores the anonymous address in the memory 215 and stores the association between IA1234 and 123 Main Street. The subscriber 302 can provide IA1234 as his or her address to banks, companies, utilities, or any desired party. The subscriber 302 can also write this code on any item to be sent as a return address.

Where the request is for a list of names and corresponding delivery points or other identifying information (e.g., phone numbers, e-mail addresses, etc.), the delivery point information system 200 may provide the list in an encrypted format. For example, as described herein, the delivery point information system 200 may provide a list of names with corresponding encrypted computer readable codes, such as barcodes, or encrypted delivery point information that the subscriber 302 uses to print computer readable codes, such as barcodes, on the items. The encrypted delivery point information or barcodes may correspond to address information that the distribution system 100 uses to properly receive, sort, and route items to which the encrypted delivery point information or barcode is applied (once the distribution system 100 decrypts the encrypted delivery point information or barcodes). This process is described in greater detail herein. In some embodiments, the entire delivery point information or barcode may not be encrypted and/or the delivery point information system 200 may also provide additional information that may assist in the routing of items to which the information is applied, such as a delivery code or similar information.

Once the encrypted delivery point information system 200 provides the subscriber 302 with the requested information, the subscriber 302 may apply the received information to an item to be shipped or mailed via the distribution system 100. In some embodiments, when the subscriber 302 receives each requested encrypted delivery point information from the delivery point information system 200 as encrypted computer readable code, the subscriber 302 prints or otherwise applies each computer readable code to individual items and introduces the items having the encrypted computer readable codes thereon into the distribution system 100. In some embodiments, the computer readable code may be a barcode, such as an IMb™, an RFID tag, a QR code, an alphanumeric code, or any other desired computer readable code, which uniquely identifies the item and/or encodes information relating to the item.

When the subscriber 302 receives the requested information from the delivery point information system 200 as encrypted delivery point information (e.g., a string of numbers that may be converted to the computer readable code), the subscriber 302 may encode the received information to the computer readable code before applying the computer readable code to the item. In some embodiments, the subscriber 302 may provide the items and the received encrypted computer readable code or encrypted delivery point information to a third party that converts and/or prints the encrypted computer readable code onto the items. As described herein, since the computer readable code is encrypted, the subscriber 302 may not continue to send items to the named recipient beyond a specified duration, after which the encryption algorithm is be changed, thus cancelling or invalidating encrypted computer readable codes after a certain time or date. In some embodiments, the encrypted computer readable codes can be single-use codes, such that once an intake, routing, or delivery scan occurs on some item processing equipment within the distribution system 100, a subsequent intake or delivery scan of the previously used encrypted computer readable code will return an error, and the item processing equipment will not further process the item, and the shipper or sender may be notified.

Figures 4A, 4B:
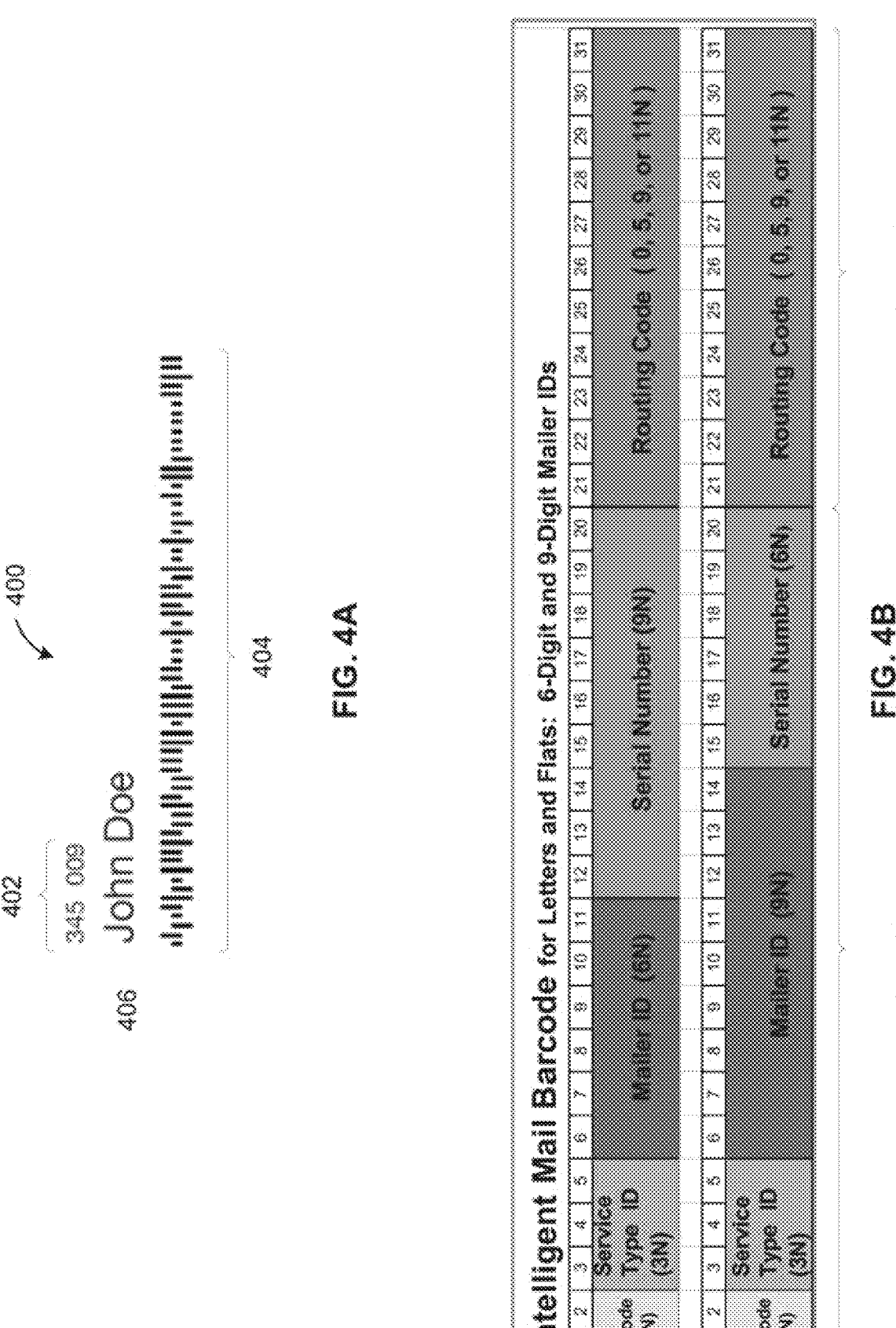
FIG. 4A is a representation of an embodiment of a computer readable code that may be applied to a distribution item.
FIG. 4B shows an exemplary encoding scheme for a computer readable code such as that in FIG. 4A.

FIG. 4A is a representation of a delivery point information block 400 comprising a computer readable code 404 and corresponding delivery information 402 and recipient name 406 that may be applied to items, where the computer readable code 404 and the delivery information 402 may be based on encrypted delivery point information received by the subscriber 302 of FIG. 3 from the encrypted delivery point information delivery point information system 200 for distribution by the distribution system 100. FIG. 4B depicts an exemplary scheme for the computer readable code 404. Although the recipient name 406 is shown, a person of skill in the art will understand that the name need not be included on an item, and that the recipient name or identifier can be contained within the computer readable code, or can be associated with the computer readable code. Items that are distributed through the distribution system may comprise a computer readable code as described elsewhere herein. In some embodiments, the computer readable code may allow a distribution entity, such as a commercial carrier, the United States Postal Service, or other distributor, to track, sort, and route each item throughout the distribution process. Thus, to allow for real-time tracking, sorting, and routing of items in the distribution system, each item may comprise a unique computer readable code. As described herein, the computer readable code may be a barcode, such as an IMb (Intelligent Mail barcode), an RFID (radio frequency identification) tag, a QR (quick response) code, an alphanumeric code, or any other desirable computer readable code, which uniquely identifies the item and/or encodes information relating to the item. Each computer-readable code may be scanned by processing equipment of the distribution system, carriers of the distribution system having mobile scanners, personnel in the distribution system, transportation providers, or by other entities within the distribution chain.

In some embodiments, the recipient name 406 of the delivery point information block 400 may be replaced with a generic identifier that assists the mail carrier in delivery of the item. For example, the recipient name 406 may be replaced with the term "resident" or any other identifier when printed on the item. In some embodiments, a social media handle, email address, or the like originally used as the unique identifier as an input into the system 200 may be printed as part of the delivery point information block 400 instead of the recipient name 406. As such, the unique identifiers may assist in delivery of the item. In some embodiments, the mail processing equipment 235 can detect the unique identifiers during sorting and routing, for example during OCR scans of items and cross verify the printed encrypted information and delivery codes with the corresponding information associated with the unique identifier in the system 200. In some embodiments, the recipient name 406 may also be left blank or replaced with a vanity term, for example "potato chip lover," "lucky winner," "Mercedes driver," or the like.

In some embodiments, the system 200 may not return the recipient name 406 when delivery point information is requested, but rather only return the computer readable code 404 (e.g., comprising the delivery point/11 digit zip code) and/or the delivery information 402. In some circumstances, the system 200 may return the original name or unique identifier with its associated delivery information 402 and encrypted elements of the computer readable code 404 for relational purposes. In some embodiments, the sender may be responsible for applying/distributing the delivery point information bock 400 including the recipient name 406 field as well as creating the computer readable code 404 with appropriate mailer ID and other information. In the case where a rotating encryption key(s) is (are) used (e.g., where each key is valid for a defined period the system), an indication regarding which encryption key was used to generate the encrypted elements of the IMb may be included in the IMb to denote the encryption used or its valid time window. In some embodiments, the sender may incorporate this indication into the service type ID of the IMb. This indicator may indicate to the mail processing equipment 235 which encryption key should be used for decryption of the encrypted IMb. If the encryption key is a perpetual key and is valid for long periods or forever, then no indicator may be provided. In some embodiments, system 200 may also return the entire IMb and delivery information.

In some embodiments, the delivery information 402 of the delivery point information block 400 may comprise 3 digits as described herein or another combination of digits to assist the mail carrier in identifying misrouted or out of sequence items. In some embodiment, a route number may be added in carrier readable form to the beginning or end of the six digits of the delivery information 402 to assist the mail carrier. In some embodiments, many different combinations for the delivery information 402 may be used. In some embodiments, the sequence of the digits of the delivery information 402 may also be changed to adjust the delivery information indicated. For example, the delivery information 402 may be the last 2 digits of an address, the last 2 digits of an apartment number, and the 2 digits of a carrier route (e.g., 13 00 52). Another example of the delivery information 402 may be the 3 digit vehicle/route number and the stop number for that vehicle/route (e.g., R13 083). In some embodiments, the delivery information 402 and its format and/or contents can be selected to assist the mail carriers while disguising or anonymizing the address to the public or to the subscriber. In some embodiments, where the anonymous delivery point identifier is a permanent anonymous address, the carrier's sorting equipment, such as the carrier's case can have the permanent anonymous delivery point identifier thereon to help with sorting and to familiarize the carrier with the anonymous delivery point.

In some embodiments, the computer readable code 404 may correspond to an IMb™. As shown in FIG. 4B, the IMb™ may correspond to a four-state barcode that encodes a string of 31-digits. In some embodiments, each digit may comprise a value of 0-9. In some embodiments, the IMb may be replaced with any other barcode or similar computer readable code comprising a plurality of characters. The 31-digit string of the IMb may comprise a plurality of fields. For example, in some embodiments, the IMb™ can include at least five different fields. The size of the fields may vary based on the information contained within each of the fields. The first field may comprise two digits and may correspond to a barcode identifier (BI). The BI may comprise a specific two-digit identifier assigned primarily to encode a presort identification that is printed in human readable form on an optional endorsement line (OEL) as well as a source channel identifier. The second field may comprise three digits and may correspond to a service type identifier (STID). The STID may correspond to any services that are requested for or on the item. The third field may comprise either six or nine digits and may correspond to a mailer identifier (MID). The MID may identify a shipping entity or customer. In some embodiments, the BI, the STID, and/or the MID may indicate that the item or the delivery point information on the item is associated with an anonymous address. For example, the BI may have a value encoded therein that signals that the item uses an anonymous address, such as a vanity address, and that the item processing equipment should query the memory 215 to identify the actual physical delivery point associated with the delivery point information on the item. In some embodiments, the STID may include a code indicating that the item uses an anonymous address. In some embodiments, the MID may include this information. In some embodiments, a mailer can be assigned a MID to be used when sending standard items, and another MID to be used when the mailer is sending items having anonymous and/or encrypted delivery point information.

The fourth field may comprise either six or nine digits and may correspond to a serial number. The serial number may aid in establishing uniqueness of the item to which it is applied. The fifth field may comprise zero, five, nine, or eleven digits and may correspond to a routing code. The routing code may be used for routing the item to its final delivery point. The first four fields may be described collectively as a tracking code and may be used for identification and tracking purposes of the item to which the IMb is applied. The tracking code may always comprise twenty digits.

The routing code may comprise a delivery point ZIP Code™, corresponding to the delivery point of the item. Its length may be dependent on an amount of routing information available. For example, if only the ZIP code of the recipient is known, then the routing code may comprise only the five digits of the known ZIP code, with no trailing digits (e.g., zeroes) to be added. Thus, for example, if no ZIP code is known, the routing code may have a length of zero digits. As described herein, the routing code may be encrypted for anonymized delivery point information. As only the digits of the routing code determine the destination, only the routing code needs to be encrypted to prevent a sender from determining a recipient's physical delivery point. In some embodiments, the entire IMb may be encrypted to prevent a shipper from associating a particular item with a recipient's delivery point.

In some embodiments, a delivery information 402 may also be included along with the IMb. The delivery code may correspond to a six-character code divided into two three-character sequences. Each of the six characters may correspond to a value of digits 0-9 or letters A-Z. The first three-character sequence may correspond to the last three characters of the primary delivery point number in a first address line of the address of the recipient of the item, such as the house number. The second three-character sequence may correspond to the last three characters of the secondary delivery point number in a second address line of the address of the recipient of the item, such as the apartment or unit number. The two three-character sequences may be separated by a space. In some embodiments, the delivery code may not be encrypted or anonymized while the routing code of the IMb is encrypted. In some embodiments, both the delivery information 402 and the routing code may be encrypted. In some embodiments, only the delivery information 402 may be encrypted by the routing code is not encrypted. For simplicity, the discussion herein will describe the routing code as being encrypted by the delivery information 402 is not encrypted. The delivery information 402 can be used by a carrier to identify the delivery point or destination of an item during the carrier's delivery route.

Figure 5:
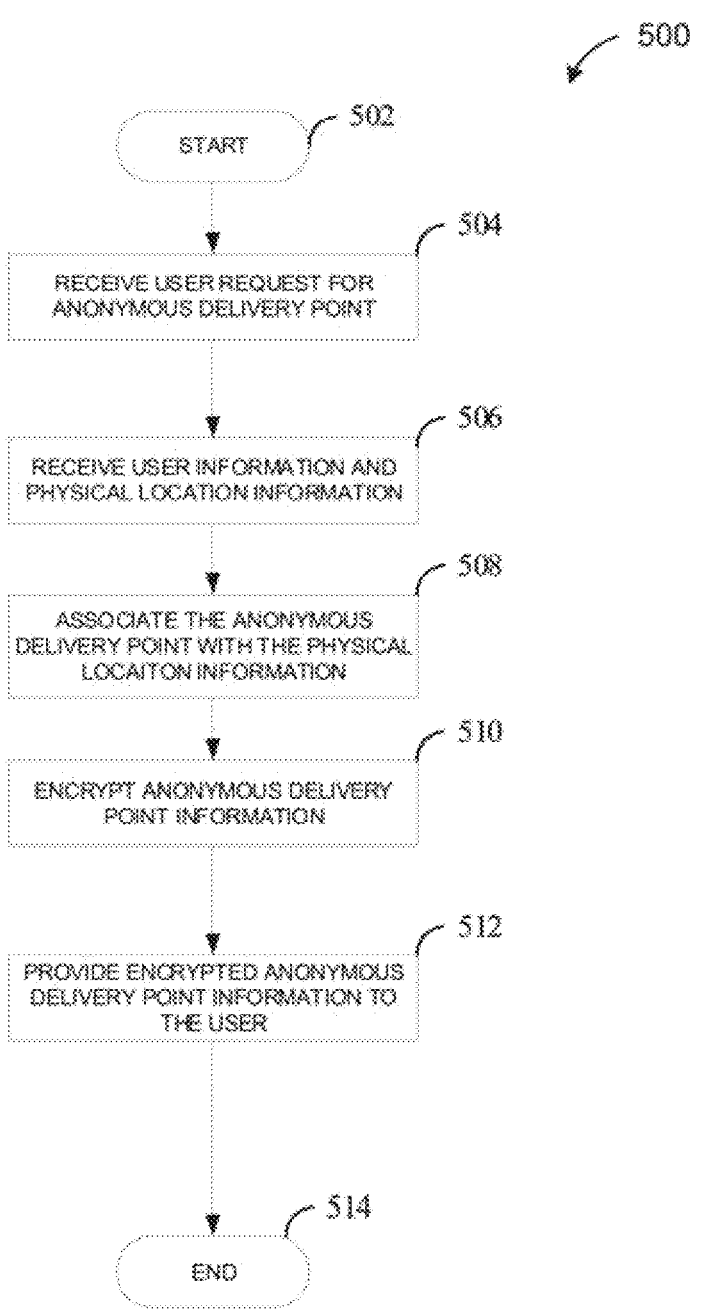
FIG. 5 is a flow chart of a method for providing an encrypted delivery point to a user based on a user request.

FIG. 5 is a flow chart of a method 500 for providing an encrypted delivery point to a user based on a user request. The method 500 may be performed by the processor 210 of the delivery point information system 200. The method 500 starts at block 502 and proceeds to block 504. At block 504, the commercial interface 230 and/or the communication module 225 receives a user request for an anonymous delivery point. In some embodiments, the user may be an individual, business, a subscriber 302, a recipient, a mailer, an online auction platform, an online commerce website, or other entity that wishes to send items to one or more recipients. For example, this user request may comprise a request to establish an anonymous address, to receive a one-time use code, a limited-time code, etc. In some embodiments, the request is made by a user who wishes to update the actual physical location associated with the user's anonymous delivery point identifier, for example, if the user has moved.

For example, a user may request a number of anonymous delivery points according to a particular target audience, demographic, market, etc. The user may request anonymous delivery points for 10,000 items to be delivered. The delivery point information system 200 can prepare 10,000 anonymous delivery point identifiers corresponding to 10,000 actual delivery points, as described herein.

The method 500 moves to block 506, wherein the system 200 receives user information and physical location information. The user information can include user identity, identification of items to be sent or received, user account information, such as login, password, or other credentials, and the like. The user information can also include a requested anonymous delivery point identifier. The user can submit the anonymous delivery point identifier the user would like associated with the users actual physical delivery location. This anonymous delivery point identifier will be placed on items intended for delivery to the user, or as the user's return address on items the user is sending. In some embodiments, the system 200 asks the user to provide another proposed anonymous delivery point identifier or anonymous address if the initial proposed anonymous delivery point identifier is not unique or is used by another entity in the system 200. In some embodiments, the system 200 provides the anonymous delivery point identifier and assigns the anonymous delivery point identifier or anonymous address to the user. In the case where the user requests a one-time code or a limited-time code, the system 200 can provide the anonymous delivery point identifier.

The user also provides physical location information to via the commercial interface 230. The physical location information can be a conventional delivery address or other indication of the actual physical location where the user resides, desires delivery, runs a business, and the like. In some embodiments, the actual physical location can be obtained from GPS data on a mobile computing device if the user is accessing the system via a mobile application.

The method 500 moves to block 508, wherein the system 200 stores the physical location information and associates the actual physical location information with the anonymous delivery point identifier received from the user or provided by the system 200. The association is stored in the memory 215. The association and the physical location information is available to item processing equipment 235 and to the mobile computing device 240.

The process moves to block 510, wherein an optional encryption step can be performed. The anonymous delivery point identifier can be encrypted in a computer readable code applied to the items if desired. The encryption may be based on the user specifics (e.g., duration). If the delivery point information for the temporary list or database generated during block 512. For example, the delivery point information corresponding to each name in the list or database may be individually encrypted to anonymize the information such that the user cannot determine the actual physical delivery point that corresponds with a given recipient name. In some embodiments, as described herein, the entire delivery point information for each recipient name is encrypted. In some embodiments, only the routing code and the delivery code may be encrypted. In some embodiments, only one of the routing code and the delivery code may be encrypted. The method 500 sends the encrypted delivery point information to the user.

The method 500 moves to block 512, wherein the encrypted anonymous delivery point identifier is sent to the user. In the case where encryption is not requested by the user, block 512 is not performed. For example, the user receives the requested 10,000 anonymous delivery point identifiers, such as computer readable codes, alphanumeric strings, etc. The user can print one of the 10,000 anonymous delivery point identifiers on each of the 10,000 items. In some embodiments, the user can print computer readable codes or alphanumeric strings on the items as the anonymous delivery point identifiers. Once the method 500 send the encrypted delivery point information to the user, the method 500 ends at block 514.

Figure 6:
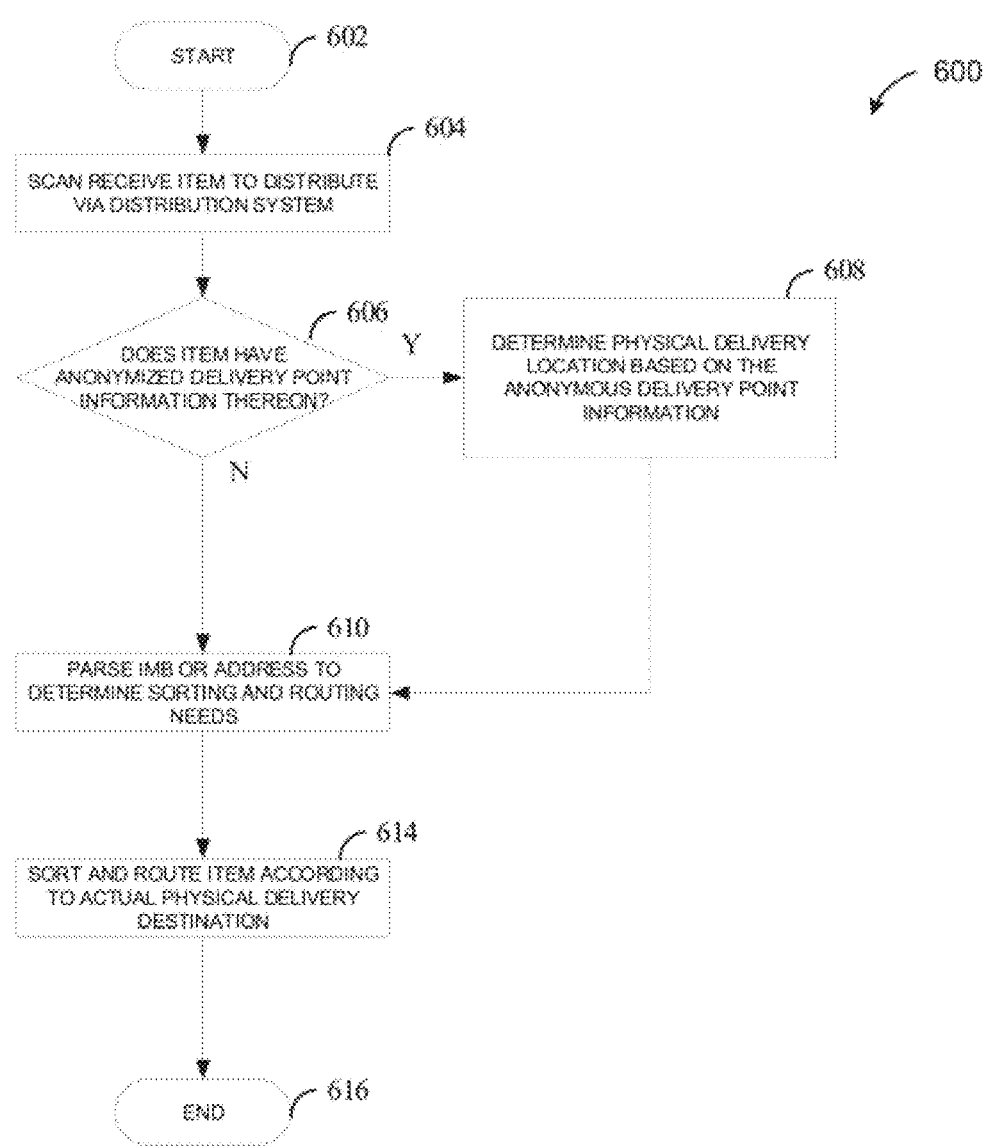
FIG. 6 is a flow chart of a method for receiving, sorting, and routing an item comprising anonymous delivery point identifier to a recipient.

FIG. 6 is a flow chart of a method 600 of receiving, sorting, and routing an item comprising having anonymous delivery point identifier thereon. In some embodiments, the method 600 may be performed by the distribution system 100 comprising the delivery point information system 200. In some embodiments, the method 600 may be performed by each piece of item processing equipment 235 and/or mobile computing device 240 in the anonymous information delivery point information system 200 that handles the item. Accordingly, the method 600 may be performed locally by each item processing equipment using components similar to those described in relation to FIG. 2 or may be performed locally and remotely, where some or all of the processing may be performed in a central location. In some embodiments, the method 600 starts at block 602 and proceeds to block 604.

At block 604, the item processing equipment 235 or the mobile computing device 240 receives an item to enter into the distribution system 100 for delivery to a recipient. In some embodiments, the receiving of the item may occur at an intake facility and may be performed by a first item processing equipment of the distribution system 100 that scans the item. In some embodiments, the receiving of the item comprises scanning the IMb™ or other computer readable code, imaging and/or OCRing a label on the item to determine a delivery point identifier, as described herein. The scanning may be performed by one or more components of the item processing equipment 235 or the mobile computing device 240 as used by a carrier. Once the item is received, the method 600 proceeds to decision state 606.

In decision state 606, the processor 210 determines whether the item contains an anonymized delivery point information, or an anonymous address. In some embodiments, this determination may be performed by the item processing equipment 235 and/or the mobile computing device 240. In some embodiments, this determination may comprise identifying an anonymization indicator located within the computer readable code. In some embodiments, the item processing equipment 235 identifies portions of the address, which indicate anonymous addresses. For example, if the address on the item includes an @, ".com", etc., indicating an email address; a single line of writing, which distinguishes it from a standard address, an alphanumeric indicator, such as a leading or trailing character or characters, (e.g., the "IA" in "IA1234"), or any other hallmark or character that is not part of a standard delivery address.

In some embodiments, the indicator that the delivery point identifier is an anonymous delivery point identifier may be included in the routing code section or other section of the IMb™. In some embodiments, the tracking code portion of the IMb may be used to determine whether the item comprises an encrypted routing code. For example, as the tracking code portion of the IMb can be a unique code specific to the item, information regarding the encrypted nature of the corresponding routing code of the IMb may be determinable (e.g., based on the association of the item with its encryption key in the storage location, as described herein).

In some embodiments, the delivery point identifier can flag the item as having an anonymous delivery point identifier by the MID, STID, or other field. In some embodiments, when the delivery point identifier is read on the item processing equipment, the delivery point identifier can be compared to a list of anonymous delivery point identifiers. If there is a match, then the item processing equipment identifies the item as having an anonymous delivery point and, if necessary, decrypts, or requests decryption, and processes the item accordingly.

If the item is determined to have anonymous delivery point identifier thereon, the method 600 moves to block 608, wherein the processor 210 queries the memory 215 to identify the actual physical delivery location or destination associated with the anonymous delivery point identifier. The process moves to block 610, wherein the processor 210 and/or the item processing equipment 235 determine how to sort and/or route the item according to the actual delivery location. In some embodiments, the item processing equipment can spray a computer readable code on the item, if not already present, which includes standard delivery information, e.g., ZIP+4 or ZIP+4+2 information for use later in the distribution network delivery stream. In some embodiments, the item processing equipment can apply a human readable indication of the delivery destination so a carrier can understand the delivery point on visual inspection of the item. In some embodiments, the code is sprayed on the item, or which is already on the item, can be scanned by the mobile delivery device 240, and the mobile delivery device can display the physical delivery point information in a human readable format.

If the item is determined to not have anonymous delivery point identifier thereon, the method 600 proceeds to block 610. When the sorting and routing instructions or needs have been determined in block 610, the method 600 moves to block 614, wherein the item is sorted and routed according to the actual physical delivery destination determined for the item. The method 600 then ends in block 616.

In some embodiments, the shipper described herein may be an individual that wishes to send an item to a known recipient but where the shipper is not aware of the recipient's most recent physical delivery point. Accordingly, in order to prevent the shipper from having to delay sending the item in order to contact the recipient and obtain the recipient's current physical delivery point, the shipper may use the recipient's name and a digital identifier of the recipient that the shipper knows, which may be different from a delivery point or physical address. The shipper can then request a delivery point or physical address from the distribution system, which the distribution can encrypt and associate with a computer readable code. The distribution network sends the computer readable code to the shipper. Thus, the distribution system may identify and provide anonymized information for a single recipient based on the shipper-provided recipient's name and unique digital identifier. In some embodiments, the memory 215 may be used to store information regarding a type and/or quantity of items received by each recipient to whom the distribution system delivers items.

FIG. 7 is a cross-functional flow diagram of a method 700 of requesting and providing encrypted delivery point information for an item and of processing and delivering the item to a recipient. The method 700 may comprise actions performed by various equipment parties, including a user that requests the encrypted delivery point information and a distribution system 100 comprising a delivery point information system 200 (as seen in FIGS. 1 and 2). The method 700 starts at block 702.

At block 702, the user submits a request for encrypted delivery point information from the delivery point information system 200, which the delivery point information system 200 receives at block 704. In some embodiments, the user request may be received via the commercial interface 230 and the communication module 225. In some embodiments, the user request may comprise a name for which the corresponding encrypted delivery point is requested. In some embodiments, the user request may comprise a quantity of names and encrypted delivery points, which the user is requesting. The request for encrypted delivery point information can be a request from a shipper or mailer desiring to send targeted items to a specific audience. The request can include, for example, criteria for recipients and potential customers, which relates to the subject matter of the item to be sent. For purposes of privacy and security, the distribution network will not provide the names and addresses, or any PII, of individuals who have not opted-in to an information-sharing program. Accordingly, the distribution network will prepare a list of individuals who meet the request from the shipper or mailer, according to the distribution network's information, and provide anonymous and/or encrypted delivery point information as described elsewhere herein. Once the user request is sent/received at blocks 702 and 704, the method 700 proceeds to block 706.

At block 706, the delivery point information system 200 identifies, in a database of the memory 215, the information requested in the user request. For example, when the user request comprises a name for which the corresponding encrypted delivery point is requested, the delivery point information system 200 determines if the database includes the name and the corresponding delivery point. If the database does include that information, then at block 708, the processor 210 or the memory 215 extracts that information from the database and temporarily stores it. If the user request comprises a quantity of names and encrypted delivery points being requested, then the processor 210 or the memory 215 extracts from the database the requested number of names and corresponding delivery points for temporary storage.

If the user request is for a number of recipients who meet certain criteria, the distribution network will use its data-based to compile delivery points who meet the criteria provided by the requester. In some embodiments, the distribution network can compile data from online services, such as websites, website agglomerators, search engines, social media companies, and others who record and identify the browsing, shopping, and other habits and activities of their customers. This information can be provided to the distribution network, and can be used to categorize the recipients or users into various categories for purposes of targeting or directed mailings. For example, if a user visits a website, searches for a product online, talks about a product, hobby, or interest on social media, for example, using hashtags, online companies can understand and track this behavior. The behavior information can be provided to the distribution network and user information can be cross-referenced with a physical delivery point or entity in the distribution network.

When a shipper or mailer requests anonymized delivery points, the distribution network can use the behavior information to identify users to whom the mailer would want to send information or items.

In some embodiments, a user can provide preferences to the distribution network via an interface, such as the commercial interfaces 230. For example, a user may receive electronic information about items, which are to be delivered to the user. The user can see images of the items to be delivered, and can interact with the interface by following a link in an email send by the distribution network, or via an application, API, or website. The user can comment on the mailpiece, such as by clicking or tapping a radio button, a thumbs-up, a like, a thumbs-down, or other similar interactions.

When the user makes such a selection, the distribution entity can determine that the "liked" item relates to one or more categories, or one or more subcategories. The user info can be stored or associated with the category for use on future mailpieces. This information can then be associated with the user and the user's actual delivery point and anonymous delivery point identifier. The information can then be used to provide customized, targeting mailings and items to the user who has expressed certain interests. In some embodiments, the use can select levels of interest, such as a "like," an indication that the user is interested in these types of mailpieces, and a request to have more similar mailpieces sent.

In some embodiments, the distribution network will provide a single anonymous delivery point identifier for a category of goods or items. When a user likes or selects a mailpiece, or when the user's preferences are determined to include particular category, the user's information, or individual anonymous delivery point identifier is added to a list or database within the memory 215. If a mailer requests 1000 delivery points interested in fishing, the distribution network returns the single anonymous delivery point identifier. As items are inducted into the mailstream, the item processing equipment 235 identifies the fishing-related anonymous delivery point identifier, accesses the list in the memory 215 of recipients, and routes the first such piece to the first recipient on the list. When the next item is inducted or processed on the item processing equipment 235 having the fishing-related anonymous delivery point identifier thereon, the item processing equipment 235 access the list in the memory 215, and routes the item to the second recipient on the list. The process can continue until an item is routed to each recipient on the list of recipients interested in fishing. The item processing equipment can spray unique identifiers, individual codes or information on the items at that time to aid in further processing throughout the distribution network.

In some embodiments, a mailer may want to send a piece of every door direct mail, which is to be delivered to every recipient within a certain geographic area. However, in a geographic area, there may be an every door direct mail item that is inapplicable to a particular delivery point. For example, if the every door direct mail item is an advertisement for lawn care, it would be inefficient to deliver that advertisement to an apartment building where there are no lawns to care for. The every door direct mail does not have individual delivery point information on it, but is distributed to every door by the carrier. When sorting and routing items of every door direct mail together with items having anonymous delivery point identifier, the every door direct mail cannot be directly sorted based on delivery point, because it does not have a specific delivery point on it, but when a piece of every door direct mail is scanned in the item processing equipment 235, the processor 210 can identify the immediately preceding item to determine whether that address is a good candidate to receive the piece of every door direct mail. If the preceding delivery point is a good fit for the mailer, then the item processing equipment 235 can route the mailer together with the preceding mailpiece. If the preceding delivery point is not a good fit for the every door direct mail, then the item processing equipment can either delay the piece of every door direct mail, or route it to another location.

The user can also customize items received via the interface by selecting categories of interest, topics, hobbies, etc. The user can indicate a time frame for each interest. The time frame can be an indication of how long the user would like to receive items corresponding to the selected interest. For example, a user may wish to buy lacrosse equipment as a gift for a birthday. The user can indicate in the customized preferences section of the application that he user would like information related to lacrosse for 2 weeks, or 1 month, or any other desired timeframe. In this way, the user will not receive advertisements or mailings related to lacrosse for years, but only for the timeframe around the birthday, or for any desired timeframe.

In some embodiments, the memory 215 can store the association of the anonymous delivery point identifier with the actual delivery point for only the amount of time selected by a user. In the case of single use code, the memory 215 can remove, clear, cancel, the association after the anonymous delivery point identifier is used once, or can indicate the use has occurred. After the time frame has elapsed, the item processing equipment 235 will not route an item with the anonymous delivery point identifier thereon.

Once the delivery point information is identified and extracted, the method 700 proceeds to block 708.

At block 708, the processor 210 or the memory 215 temporarily stores the delivery point information identified and extracted from the database before the method 700 proceeds to block 710. At block 710, the encryption/decryption module 220 or the processor 210 may encrypt the stored delivery point information. In some embodiments, as described herein, a type or level of encryption may be selected based on one or more of the user, the quantity of names and delivery points requested, or a preset encryption level or type, at this block. Once the method 700 encrypts the delivery point information, the method 700 proceeds to block 712.

At block 712, the encrypted delivery point information is provided or sent to the user. In some embodiments, the communication module 225 or the commercial interface 230 performs the block 710. In some embodiments, the encrypted delivery point information may be conveyed to a third-party shipper instead of or in addition to the user. In some embodiments, the encrypted delivery point information comprises encrypted routing codes corresponding to 31-digit strings that form IMbs. In some embodiments, the encrypted delivery point information that is provided or sent also includes delivery codes as generated based on the delivery point information. In some embodiments, the delivery codes themselves may also be encrypted or only the delivery codes may be encrypted by the routing codes are not encrypted. In some embodiments, the encrypted delivery point information comprises the IMbs themselves along with the corresponding delivery codes for each name provided, where either one or both of a portion of the IMb and the delivery code is encrypted. In some embodiments, sending the encrypted delivery point information to the user may comprise sending the encrypted delivery point information to a third party. Once the encrypted delivery point information is provided or sent to the user, the method 700 proceeds to block 714.

At block 714, the user (or third party shipper) prints or applies the encrypted delivery point information on an item to be sent to the recipient. In some embodiments, the user may print or apply the encrypted delivery point information (for example, in IMb™ format) to the item. In some embodiments, a third party may apply the encrypted delivery point information to the item. Once the encrypted delivery point information is applied to the item, the method 700 proceeds to block 716.

At block 716, the user enters the item(s) into the distribution system 100. In some embodiments, this may comprise the user or third party depositing the item with an intake facility (e.g., via a carrier or drop-off at a delivery unit 104). This may also comprise the distribution system 100 receiving the item at the intake facility and scanning the item for computer readable code (e.g. the IMb). Once the item is entered into the distribution system 100, the method 700 proceeds to block 718.

At block 718, the encryption/decryption module 220 or the processor 210 decrypts the encrypted delivery point information. In some embodiments, this may comprise parsing a decrypted IMb. Block 718 of the method 700 may also be performed by one or more of the memory 215, the item processing equipment 235 and/or the mobile computing device 240. Once the encrypted delivery point information is decrypted, the method 700 proceeds to block 720. At block 720, the item processing equipment 735 and/or the mobile computing device 740 may be used to sort and route the item. The sorting and routing results in the item being delivered to the desired recipient without disclosing the recipient's physical, unencrypted delivery point to the user or to any party outside of the distribution system 100. Accordingly, the method 700 ends at block 718 once the item is delivered.

Anonymous delivery points, as described herein, can also be used to facilitate dynamic warehousing schemes or operations. Dynamic warehousing can refer to ways to store goods, or merchandise while it is en route to a destination. As the goods are in transit, the goods may not have a specific delivery point assigned, but may be assigned to a general geographic area, and, thus, the items are warehoused in rolling stock or delivery equipment. As the items are in the vehicles, such as rolling stock, trucks, trailers, cars, trains, planes, ships, etc., the items can be moved to general geographic areas or regions, without being assigned to a specific delivery point. When an order comes in for such goods, the good or merchandise can be dynamically routed to the specific recipient from the rolling stock.

As one example, a retailer may have a new product that is intended to launch on a Monday morning. The retailer and/or the distribution network can estimate how many of the new product will be needed or requested in one or more specific geographic areas. The retailer or distribution network can use past shipment information, third-party information, and/or predictive analytics to predict how many of the new product should be sent to each geographic area. The retailer can request a plurality of labels, identifiers, barcodes, computer readable codes, etc., from the distribution network, such as via an interface, API, and the like. In some embodiments, the retailer can be an advertiser working on behalf of the retailer or other company that distributes mass mailings (for example, a print shop and the like), and the retailer can request address information in bulk for mailers prepared or being prepared for distribution. The codes may be requested by receiving a manifest, such as an electronic manifest from the retailer, supplier, and/or shipper. The distribution network can generate a plurality of anonymous delivery point identifiers or unique computer readable codes (these terms can be used interchangeably herein), which, for example, encode or have information associated with an identifier of the shipper and an identifier that the code is for use with a dynamic warehousing service. The identifier indicating that the code is for use with a dynamic warehousing service can indicate to item processing equipment, which scans the code, that different, additional, or other processing is needed, required, or desired.

The distribution network can send the plurality of unique computer readable identifiers to the shipper or sender, and the shipper or sender can place the unique computer readable identifiers on the items to be shipped, by printing, using labels, etc. In some embodiments, the distribution can place the computer readable identifiers on the items by printing, spraying, labeling, etc. the items once they are received from the shipper.

The shipper or sender can drop the items at a distribution facility on a particular date. That date may be earlier than the release date of the item or product, in order to allow sufficient time for the items to be transported to the general geographic areas by the release date. The distribution network obtains the new product, and places the unique computer readable identifier or anonymous delivery point identifier on each product. The anonymous delivery point identifier is not assigned to or associated with a specific physical delivery point at this stage, but can be associated with a general geographic area or region. The new products having anonymous delivery point identifier thereon can be sorted or processed on item processing equipment or apparatuses at a facility. The anonymous delivery point identifiers are scanned or read, and the items are routed to the general geographic area associated with the anonymous delivery point identifiers. The items are placed on transportation vehicles, such as trucks, trains, or any other type of transportation vehicle on Saturday or Sunday, depending on when the vehicle is anticipated to arrive in the general geographic area. As the product is "warehoused" on the trucks, the vehicles travel to key hubs within the specific geographic areas from which the products will be sorted and delivered to recipients.

On Monday morning, the product is launched and is available to order. As one of the new products is ordered by a recipient within the specific geographic area, the vendor, retailer, seller, etc., provides sale information and an actual physical delivery point, such as an address, to the distribution network. The distribution network selects one of the items, which is en route to or has been delivered to the general geographic area, and assigns the anonymous delivery point identifier on the product to the actual specific physical delivery point for the recipient who ordered the product. The distribution network uses the association with the actual physical delivery destination to deliver the new product to the recipient. The sale information can come via a third-party application using an API, can be communicated directly to the distribution network, and the like. In some embodiments, the produce seller communicates with the distribution network via the commercial interfaces 230.

When the truck arrives at the delivery facility, the item processing equipment 235 scans or reads the anonymous delivery point identifier on the new product. The processor 210 queries the memory 215 to identify the specific actual physical delivery destination for the new product, and routes the new product accordingly, as described elsewhere herein.

The buyer of the new product receives the item from the carrier on the day of the launch, or within a shortened time period as compared to ordering the new product and waiting for it to be shipped form original warehouse. The buyer also need not go to the store to pick up an ordered item on launch day.

In another example, the dynamic warehousing concept can apply to items that are frequently or repeatedly purchased in an area and delivered to recipients in that area. By using dynamic warehousing, retailers, sellers, and vendors do not need to keep as much inventory on hand to meet demand. This can also eliminate delivery delay for products that are routinely purchased and delivered to the geographic area.

Figure 8:
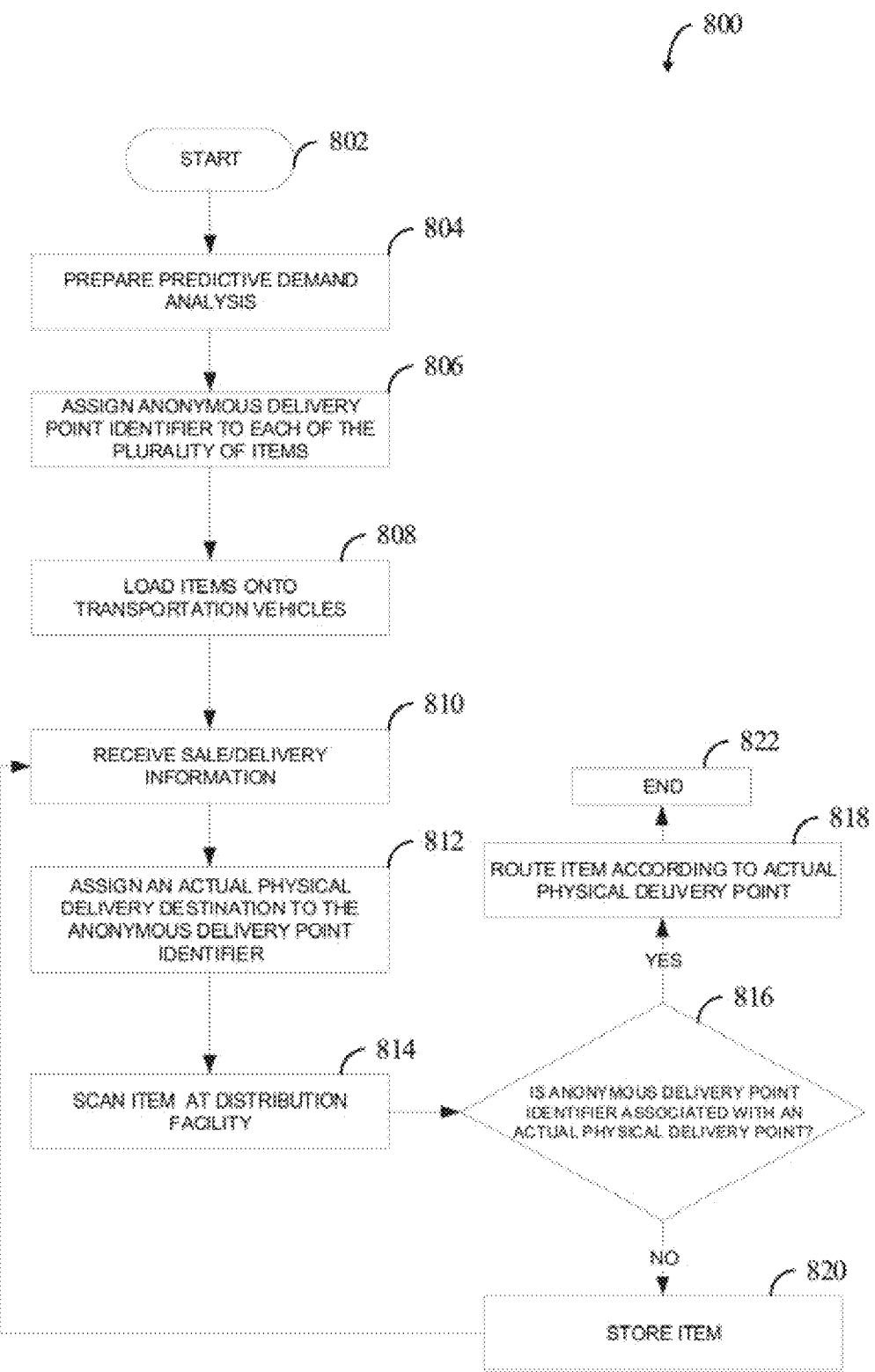
FIG. 8 is a flow chart depicting an embodiment of a dynamic warehousing process.

FIG. 8 is a flow chart depicting an embodiment of a dynamic warehousing process. Process 800 starts in block 802. The process 800 moves to block 804, wherein a distribution network, product seller, retailer, etc. prepares predictive demand analysis to determine how many of an item will be ordered, bought, demanded, or needed in a geographic area. This prediction can be performed using historical sales information in the case of a new product launch. For example, the retailer can provide sales numbers for geographic regions. The distribution network can determine how many of a similar or the same item were shipped within the last day, week, month, or other time period, or during the last similar product launch. The retailer can provide a number of items that will be shipped to the distribution network, such as on a manifest. In some embodiments, process 800 can omit block 804.

The process 800 moves to block 806, wherein the number of products according to the predictive demand analysis, or the number of products available to or provided by the seller, retailer, etc., are assigned an anonymous delivery point identifier. These can be computer readable codes, such as the IMb™, which uniquely identify the item, or which are unique to each item. This anonymous delivery point identifier is stored in the memory 215 of the system 200.

The process 800 moves to block 808, wherein the items having the anonymous delivery point identifier thereon are loaded on to vehicles for transportation to specific geographic areas. At this stage, the anonymous delivery point identifier is not associated with an actual physical delivery destination.

The process 800 moves to block 810, wherein the distribution network receives sale/delivery information for the one or more of the plurality of items on the vehicles. The item seller or retailer receives a request to purchase, payment, and delivery information for one or more of the items on the vehicles. The delivery information includes an actual physical delivery destination for the purchased item. The item seller or retailer provides the payment and delivery information to the distribution network.

The process 800 moves to block 812, wherein the distribution network assigns the actual physical delivery destination one or more of the items and associates the actual physical delivery destination with the anonymous delivery point identifier on the one or more items. To do this, the processor 210 identifies which vehicle is headed for the geographic area in which the buyer is located, or in which the actual physical delivery destination is located. The distribution network then associates the actual physical delivery destination to one of the anonymous delivery point identifier entries corresponding to an item on the vehicle.

The process 800 moves to block 814, wherein the vehicles arrive at a distribution facility and unload the items for sorting and delivery. The items are scanned at the distribution facility, and the item processing equipment 235 reads the anonymous delivery point identifier on the items unloaded from the vehicle. The process 800 moves to decision state 816, wherein it is determined whether the scanned anonymous delivery point identifiers are associated with actual physical delivery destinations. If the anonymous delivery point identifier is associated with an actual physical delivery destination, the process moves to block 818, and the item processing equipment 235 sorts and/or routes the item to its destination, as described elsewhere herein. This can be repeated for each item on the vehicle, after which the process ends in 822.

If the autonomous delivery point identifier is not associated with an actual delivery point, the process 800 moves to block 820, wherein the item is stored awaiting the receipt of sale/delivery information for the item, and the process returns to block 810.

Figure 9:
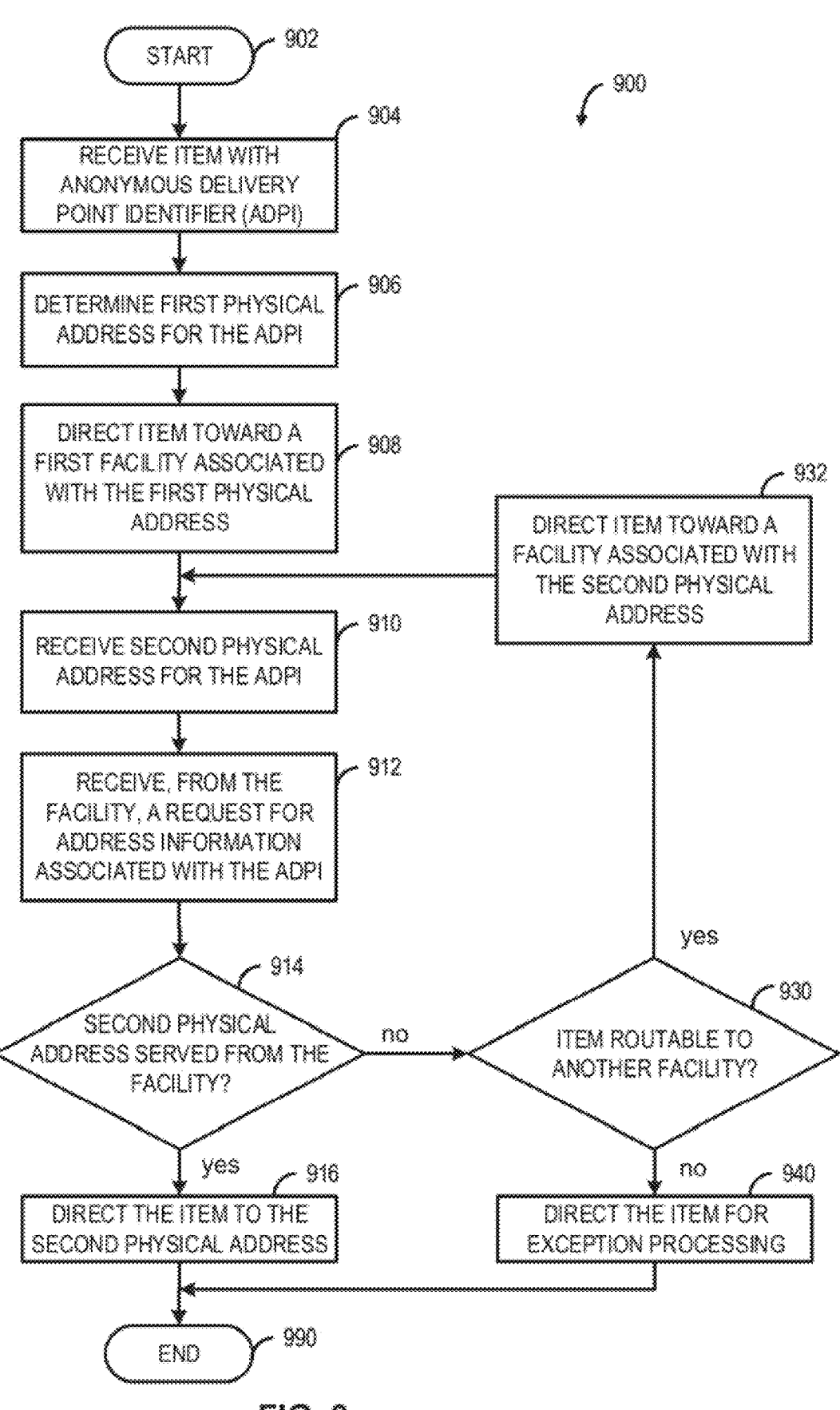
FIG. 9 is a flow diagram depicting an example method of redirecting an item having an anonymous delivery point identifier.

FIG. 9 is a flow diagram depicting an example method of redirecting an item having an anonymous delivery point identifier. The method 900 may be implemented in whole or in part by a coordination device such as the processor 210 of the delivery point information system 200. The method 900 illustrates how the physical address associated with an anonymous delivery point identifier (ADPI) may change after an item is inducted into the distribution network.

The method 900 begins at block 902. At block 904, the coordination device may receive an item for delivery having an ADPI thereon. Receiving the item may include receiving the item in mail processing equipment having a scanner. In some embodiments, receiving the item may include receiving information scanned from the item such as a barcode or other indicia of the ADPI. Receiving the item can occur at a distribution facility where the item is inducted into the distribution network, and from there the item may be routed toward a recipient's physical address.

At block 906, the coordination device may determine a first physical address for the ADPI. Determining the first physical address may include decoding the information received at block 904. Determining the first physical address may include querying a data source including a mapping between the ADPI and a current address. In some implementations, the ADPI may be encrypted. In such implementations, the determining at block 904 may include decrypting the indicia such as shown in FIG. 7.

At block 908, the coordination device may direct the item toward a first facility associated with the first physical address. For example, the induction facility may be in Texas whereas the first physical address is in New Jersey. The coordination device may provide a control message to direct the item from the facility in Texas to a container or other receptacle heading to New Jersey. The control message may include information to print upon the item to facilitate direction of the item through the distribution facility. Processing equipment in a facility, such as mail processing equipment or sorting equipment can use a scanner (e.g., an optical or magnetic scanner) and may scan the printed information to identify the intended destination of the item. Once the intended destination is identified, the mail processing equipment will direct the item to a sorting destination in the distribution facility, according to the intended destination.

At block 910, the coordination device may receive a second address for the ADPI. For example, a user or recipient may wish update the address associated with the ADPI while the item was en route, or after the item had an initial scan on induction into the distribution network. In some embodiments, the recipient may change, permanently or temporarily, the physical address associated with the ADPI, for example, where the user wants a particular item delivered to a location other than a home address, such as a PO Box, a parcel locker, a hotel, or any other desired location.

At block 912, the coordination device may receive a request for address information associated with the ADPI from a distribution facility. The request for address information associated with the ADPI can come from mail processing equipment or other apparatus in the distribution network, which is downstream of the induction point, where the first physical address was determined in block 906. For example, the coordination device may receive the request from an intermediate facility, a facility for a carrier responsible for delivering the item to a specific physical address, a vehicle carrying the item for delivery to a specific address, or a handheld device of a carrier delivering the item to a specific address. The request may include information scanned from the item such as a barcode or other indicia of the ADPI or information printed on the item during processing in a distribution facility.

At decision state 914, the coordination device may determine whether the address associated with the ADPI can be served from the distribution facility where the item was processed in block 912. For example, the change from the first physical address to the second physical address may not require handling the item by a different carrier. One example is changing an apartment number on an item. Such a change does not generally require a reassessment of which carrier and route to send an item for deliver. Other changes may require significant changes to the distribution plan or path through the distribution network for the item. For example, if the first physical address was associated with Trenton, Texas but the second physical address identified Trenton, New Jersey, the item may need to be rerouted to a different facility.

In the case where the item can be served from the current facility even in view of the changed address, the determination at block 914 is affirmative. The determination may compare information for the current address associated with the ADPI to a service area defined for the facility transmitting the request. If the current address (e.g., ZIP Code) is within the service area of a post office currently holding the item, then the determination at block 914 may be affirmative.

In the affirmative case, the method 900 proceeds to block 916. At block 916, the item is directed to the second physical address. This may include delivery of the item to the second physical address or routing the item to a subsequent distribution facility. The method 900 may end at block 990, however, if the item is not yet delivered, the method 900 may return to block 912 as described to continue assessment of the ADPI as described.

Returning to block 914, if the facility cannot serve the second physical address associated with the ADPI, the method 900 may proceed to block 930. At block 930, the coordinating device may determine whether the item is routable to another facility that can serve the physical address associated with the ADPI. The determination may include identifying a service level for the item. For example, an item may be inducted with a sufficient service level that allows dynamic re-routing of an item to any address. In some implementations, the re-routing may be limited such as to any address within a radius of the initial address. This avoids several problems faced in item delivery. For example, a user may request delivery of an item within their hometown and receive an estimate (e.g., time, fee, etc.). Once inducted, the user may then update the address associated with their ADPI to an international address, far away from the original address. In such instances, the original estimate may no longer apply.

The change of physical address associated with an ADPI may depend on whether items are currently being processed with the ADPI. In such instances, a user requesting the change may need to confirm or provide additional information to affect the change or at least affect the change for the item being processed.

If the item is routable to another facility either because of additional authorization from the user or because sufficient service level is associated with the item to authorize rerouting, the determination at block 930 is affirmative. The method 900 may then proceed to block 932 to direct the item toward a distribution facility associated with the second physical address. The coordination device may provide a control message to direct the item from the current distribution facility to another distribution facility associated with the second physical address. The control message may include information to print upon the item to facilitate direction of the item through the distribution facility. Processing equipment in a facility (e.g., an optical or magnetic scanner) may scan the printed information to identify the destination of the item. Once identified, downstream processing equipment such as conveyors, sorters, etc. may be adjusted to direct the item. The method 900 then continues to block 910 as described above.

Returning to block 930, if the determination at block 930 is negative, at block 940, the item may be directed for exception processing. Exception processing generally refers to handling of an item that cannot be delivered or which cannot be delivered according to the service type. Exception processing may include identifying a return address and routing the item to the return address. Exception processing may include holding an item and requesting additional information from either or both of the sender and recipient of the item. For example, the coordination device may transmit a message to the recipient indicating the need for rerouting and conditions to reroute the item. In some embodiments, the exception processing can route the item to the next distribution facility in order to deliver the item, and may also send a message to the sender and/or the recipient indicating that a service standard cannot be met due to the change from the first physical address to the second physical address.

In some embodiments, the message may cause a device receiving the message to activate and/or initiate an application that is configured to obtain additional information for the item. In some implementations, the application may be initiated on the device and, upon receipt of the message, the interface of an application included on the device may be adjusted using the received message.

The method 900 may end at block 990. However, during exception processing, such as returning the mail to a return address, or notifying sender or recipient regarding a change or missed service standard, the method 900 may be repeated to assess a return address for the item that may be specified using another ADPI.

Figure 10:
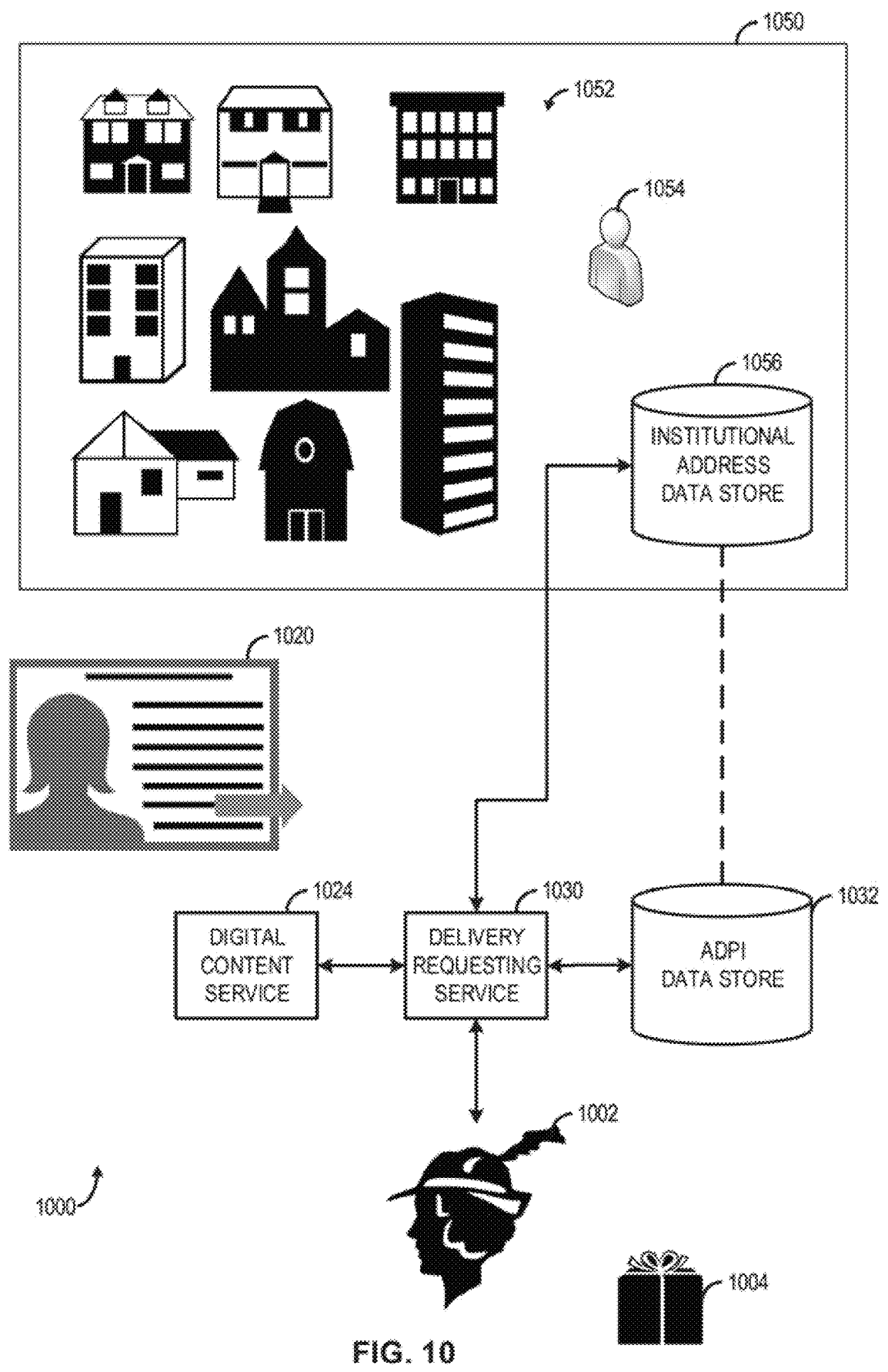
FIG. 10 is a pictorial diagram illustrating features of an environment for anonymized delivery point information.

FIG. 10 is a pictorial diagram illustrating features of an environment for anonymized delivery point information. The environment 1000 may provide processing of a physical item 1004 or conversion of a digital item 1020, such as a photograph or online social media post, to a physical item for delivery to a recipient 1054. The recipient 1054 may be associated with an institution 1050 that has multiple locations 1052. The recipient 1054 may move between the multiple locations 1052 within the institution 1050. Examples of such institutions include hospitals, universities or colleges, prison systems, military bases and camps, multi-campus corporations, and the like. At any point in time, the current address of the recipient 1054 within the institution 1050 may be unknown to a sender 1002 of an item.

In such instances, the sender 1002 may identify the address of the recipient 1054 using an ADPI. To send the physical item 1004, the sender 1002 may include the ADPI on the physical item 1004. The delivery requesting service 1030 may associate the ADPI with an institutional address of the recipient 1054. In this way, the sender 1002 need not know the exact location of the recipient 1054 to send the physical item 1004 to the recipient 1054.

The ADPI may be generated as described and stored in an ADPI data store 1032. The ADPI may be associated with an identifier for the recipient 1054. This identifier may be used to request a current location of the recipient 1054 from an institutional address data store 1056. In this way, the institution 1050 maintains control and confidentiality of the address of the recipient 1054 but provides a mechanism to provide addressing information that can be used to direct an item to the recipient 1054.

In some instances, the sender 1002 may identify the digital item 1020 for delivery to the recipient 1054. For example, many prisons do not allow inmates access to the Internet. As another example, forward deployed service members or hospitalized individuals may have limited Internet access. The sender 1002 may desire to send a family picture from an internet site, social media, a user's digital photography equipment, or the like to the recipient 1054. The sender 1002 may transmit a request identifying the digital item 1020, or, in some embodiments, the digital item or a copy of the digital item, and the ADPI for the recipient 1054. The delivery requesting service 1030 may obtain the digital item 1020 from a digital content service 1024. The delivery requesting service 1030 may generate a physical copy of the digital item 1020 (e.g., print a photograph or document). The physical copy may then be prepared for induction into a distribution network to deliver the item based on the ADPI of the recipient 1054 rather than a specific physical address.

In some instances, the sender 1002 may not know the ADPI for the recipient. To facilitate identifying the recipient's ADPI, features for verifying a recipient and generating a code for the recipient may be included.

Figure 11:
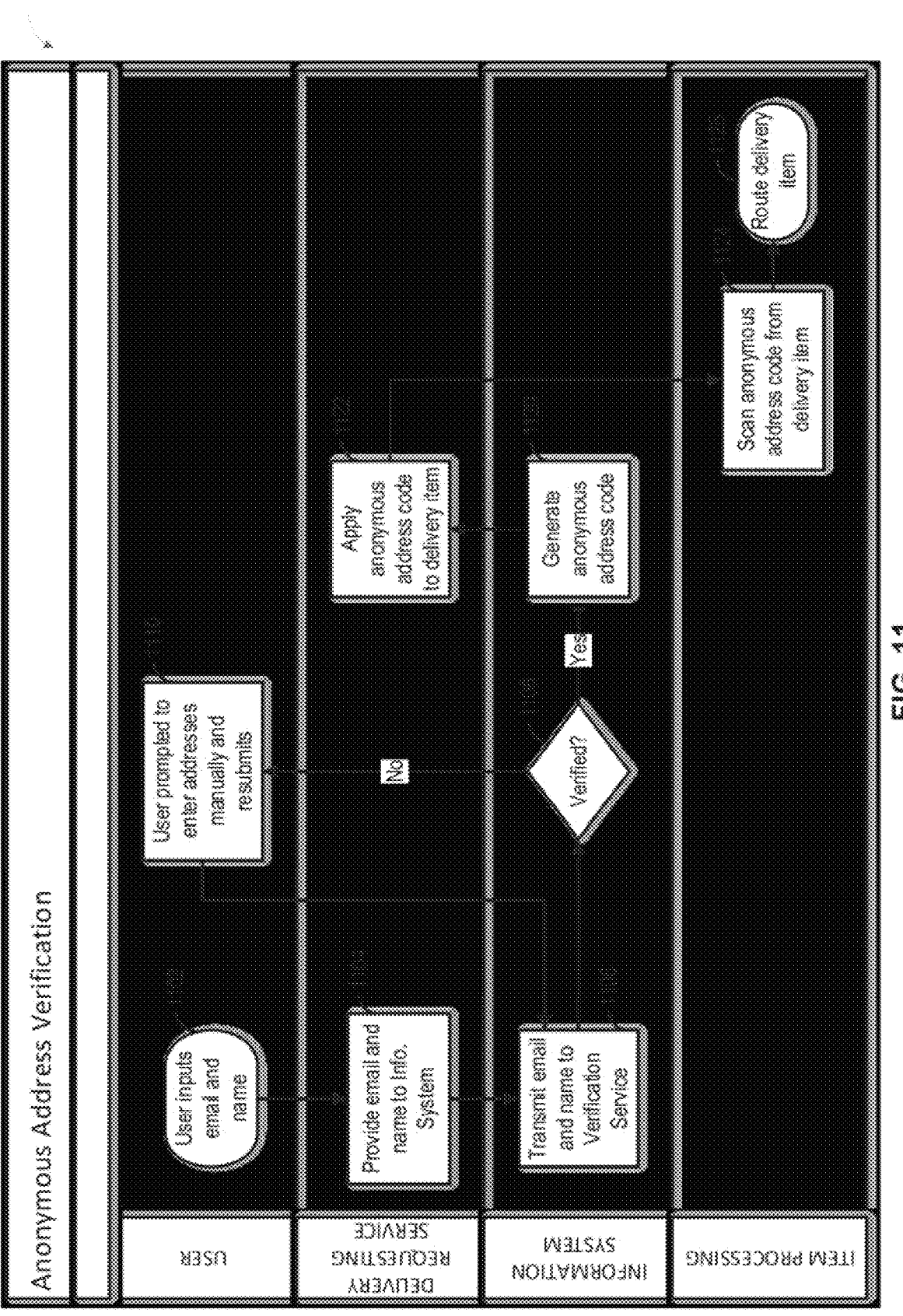
FIG. 11 is a process flow diagram of a method for anonymous address verification.

FIG. 11 is a process flow diagram of a method for anonymous address verification. The method 1100 may be performed in whole or in part by a coordination device such as the processor 210 of the delivery point information system 200. The method 1100 illustrates how information about a recipient such as name or email address can be used to verify the recipient and generate a one-time code or a limited-time code for anonymous addressing.

At block 1102, a user, such as the sender 1002, may provide information about a recipient such as name and email address. The delivery requesting service may determine that it has no address record for the name and email address provided. At block 1104, the delivery requesting service may transmit the information about the recipient to the information system. At block 1106, the information system may itself or via a third party verification service, generate verification information for the recipient. The verification information may include a name associated with the email address received. If a name received from the verification service (or internal records) corresponds to the name provided by the user, at block 1108, the information system may deem the recipient verified. At block 1120, the information system may generate an ADPI for the recipient as described. Generating the code may include creating a one-time code for delivery of a specific item. In some implementations, the code may be a pre-generated ADPI code associated with the recipient.

At block 1122, the delivery requesting service may apply the ADPI to the delivery item (e.g., physical item presented for delivery or a generated physical copy of digital content for delivery). At block 1124, item processing (e.g., induction facility or other distribution facility) may scan the ADPI from delivery item and at block 1126 route the delivery item as described.

Returning to block 1108, if the information system does not verify the recipient's information, the method 1100 may continue to block 1110. At block 1110, the user may be prompted to provide a physical address and/or updated recipient information for additional verification. This updated information may be then used to continue the verification method shown in FIG. 11.

The embodiments describe aspects of requesting a one-time code or a limited-time code. A sender of an item may request a code on behalf of a recipient of the item. In some implementations, the sender of an item may request a code for its use as a return address (e.g., for returning items to the sender). This return address information may be included on the physical item to be delivered to a recipient. The return address information may be included on a pre-paid postage label included with the physical item to facilitate a return of the item to a coded address. In some implementations, the sender may be a third party (e.g., an auction or catalog merchant). In such implementations, the sender may request a code on behalf of either or both of the party providing the item and the party receiving the item. The request may be submitted upon satisfaction of a predetermined criterion such as providing verification of identity of either party or confirming a destination address includes processing equipment capable of handling a physical item including a one-time code or a limited-time code.

Figure 12:
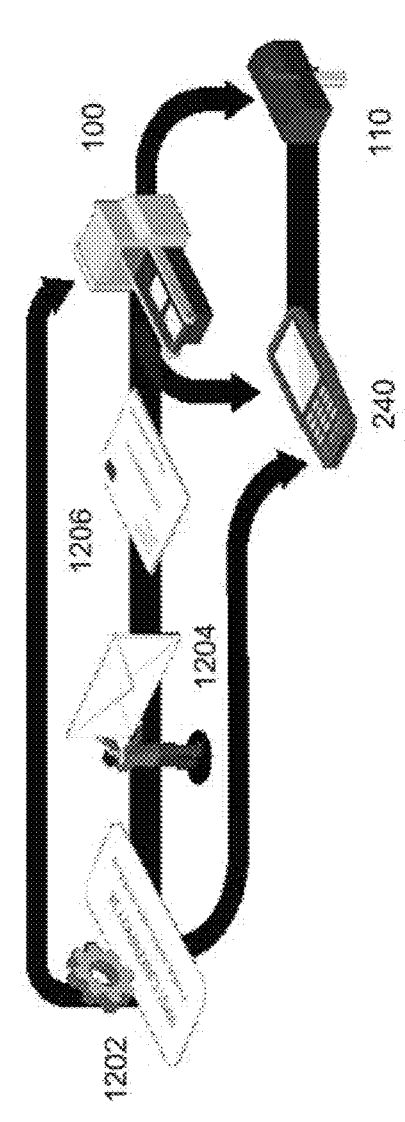
FIG. 12 is a flow diagram showing a process for processing an item having an internal control value associated therewith.

FIG. 12 is a flow diagram showing how the distribution system 100 of FIG. 1 handles an item comprising an internal control value. At 1202, the distribution system 100 may generate the internal control value (also referred to herein as the code) for an item to supplement the delivery point information or to replace all or part of the delivery point information normally placed on the item. In some embodiments, the code may be generated in response to a request from a mailer for delivery point information for a number of entities or potential customers, for example delivery point information for 1000 customers that show interest in a particular subject and so forth. The mailer may wish to send direct mail (for example, coupons or advertisements) to these customers. Instead of providing street addresses or delivery point codes to the mailer, the distribution system 100 may provide the mailer with the internal control value for each delivery point associated with an identified potential customer. The mailer can then apply the codes to the items and place them in the mail, ensured that the items will be delivered to the appropriate customers (i.e., delivery points) without learning the delivery point information for the respective customers. In this way, the distribution system 100 can provide such a service to mailers while maintaining confidentiality regarding PII of distribution system 100 customers. The distribution system 100 may identify and parse the codes when the items are handled by the distribution system 100 to distribute the items to the appropriate recipients, as discussed further below.

At 1204, the distribution system provides the generated codes to the mailer to apply to the items and place in the mail stream. By only having access to the generated codes, the mailer is unable to identify the address information for the customers to which the mail items are sent. In some embodiments, the distribution system 100 may rotate codes at various intervals (for example, monthly, quarterly, annually, and so forth) to maintain codes for which the mailer cannot reverse engineer the delivery point information corresponding to the codes.

At 1206, the items with the codes enter the mail stream and are processed by the distribution system 100. The distribution system 100, and more particularly the processing equipment for the distribution system 100, may receive the codes from the items (for example, by scanning the items with OCR or similar systems and software) and access profiles where the codes are related to corresponding delivery point information. In some embodiments, the processing equipment may receive necessary information to generate the delivery point information from the code for each item processed by the processing equipment (for example, determining if the code is encrypted with an encryption key or hash value) and where in a profile database or similar database corresponding delivery point information can be found for the scanned or identified code. The distribution system 100 may then route the item to the recipient 110 directly or via a carrier using an MDD 240. The carrier can scan or image the item with the MDD 240 and the MDD can display the delivery point in a human readable format. The MDD 240 may access the code and delivery point information association via the user profiles or by receiving corresponding information from the distribution system 100 to convert the codes to the delivery point information.

Figure 13:
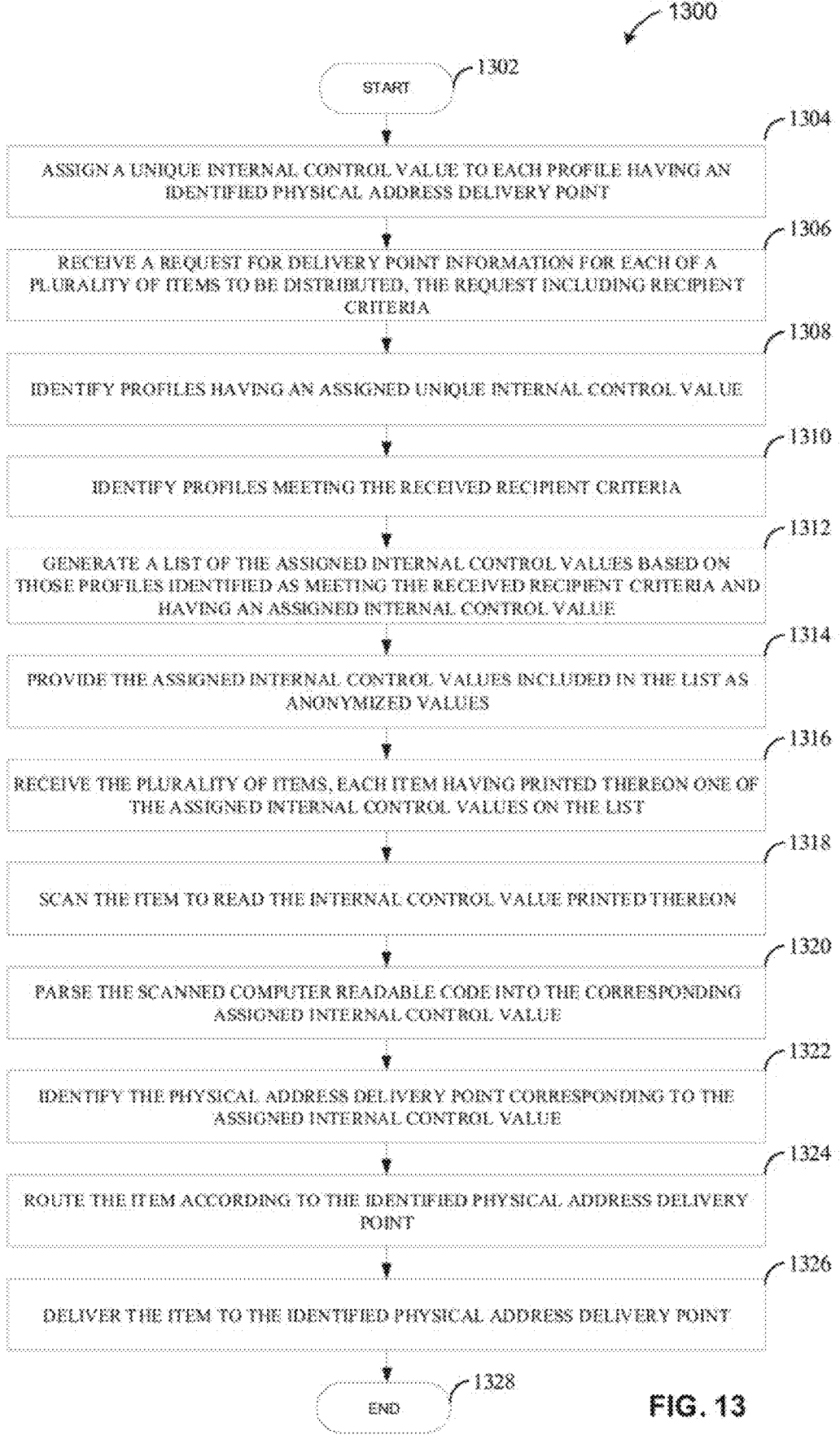
FIG. 13 is an example of one embodiment of a flowchart for a method, process, or data flow diagram for processing items and requests for information for distribution of the items via the distribution system.

FIG. 13 is a flowchart for an exemplary method, process, or data flow diagram 1300 for processing items and requests for information for distribution of the items via the distribution system 100. The method 1300 includes various blocks used to process requests for information and generate responses to the requests before receiving items and distributing the items to corresponding destinations. The method 1300 may be run simultaneously, in an overlapping manner, or sequentially in multiple instances based on requests from multiple mailers or other entities that are each requesting information for mailing items via the distribution system 100. The various blocks of the method 1300 may be performed by one or more components of the distribution system 100 or the delivery point information system 200 as described in relation to FIGS. 2 and 3, respectively. For example, one or more blocks of the method 1300 may be performed by the processor 210. In some embodiments, one or more of the blocks of the method 1300 are implemented by one or more of the other components of the distribution system 100 or the delivery point information system 200. In some embodiments, the blocks of the method 1300 are performed in a sequential manner, while in other embodiments, the blocks of the method 1300 may be performed in a non-sequential manner, regardless of the terminology used to describe the method 1300 herein. A person having ordinary skill in the art will appreciate that the method 1300 may be implemented by other suitable devices and systems. Although the method 1300 is described herein with reference to a particular order, in various aspects, blocks herein may be performed in a different order, or omitted, and additional blocks may be added.

At block 1304, the method 1300 comprises assigning, in a profile database, a unique internal control value to each profile having an identified physical address delivery point. In some embodiments, each unique internal control value or code may have a character length equal to a character length of delivery point information otherwise printed on items to be distributed by the distribution system 100. In some embodiments, the delivery point information enables distribution of the items to their corresponding physical address delivery points. In some embodiments, the unique internal control value or code may have a character length that is different from the character length of the delivery point information otherwise printed on the physical distribution items. In some embodiments, each unique internal control value or code comprises a prefix code or portion shared by multiple internal control values and a unique portion unique to the unique internal control value or code. In some embodiments, the prefix code identifies the type of unique internal control value or code (for example, an internal address code or an internal control value). In some embodiments, one or more portions of the prefix code or portion identifies the house number (for example, address on the delivery route or the house number from the street address), unit information, information regarding whether postage was paid for the item, and so forth.

At block 1306, the method 1300 comprises receiving, via a sender interface, a request for delivery point information for each of a plurality of items to be distributed, the request including recipient criteria. In some embodiments, the requesting entity is a mailer. In some instances, the request may be for a specified number of delivery points.

At block 1308, the method 1300 comprises identifying, in the profile database, profiles having an assigned unique internal control value or code. In some embodiments, the profile database comprises a plurality of user or consumer profiles that include delivery point information for the respective consumer (for example, an address for the consumer). In some embodiments, identifying the profiles having assigned unique internal control values or codes comprises identifying profiles for consumers that have, in their profiles, delivery point information. As described herein, the internal control value comprises values that can replace delivery point code information on items. This allows the method 1300 to identify profiles for which information is provided to the requesting entity or mailer.

At block 1310, the method 1300 comprises identifying, in the profile database, profiles meeting the received recipient criteria.

At block 1312, the method 1300 comprises generating a list of the assigned internal control values based on those profiles identified meeting the received recipient criteria and having an assigned internal control value. The list may comprise all of the identified profiles that were identified as having delivery point information in the profile of the profile database.

At block 1314, the method 1300 comprises providing, via the sender interface, the generated list. The assigned internal control values included in the list can anonymized to prevent the mailer from receiving the identity of recipients or delivery points associated with the internal control values. Anonymizing can be done as described elsewhere herein through encryption, hashing, etc. Because the internal control value represents "encrypted" or "hashed" delivery code information, the internal control values may be safe to share with the mailers because the mailers cannot identify PII or delivery point information for the corresponding consumers.

At block 1316, the method 1300 comprises receiving the plurality of items. In some embodiments, each item has printed thereon a computer readable code corresponding to one of the assigned internal control values on the list. The computer readable code may represent the alphanumeric code introduced above or a barcode (or similar) computer readable code. For example, the assigned internal control value is printed on the item in place of the physical address delivery point for the item.

The method 1300 may further comprise multiple steps, performed for each of the plurality of items received. For example, the method 1300 comprises, at block 1318, scanning, by item processing equipment, the item for the internal control value (in some examples, a computer readable code) printed thereon. Thus, in block 1318, the system may scan items distributed or entered into the distribution system 100 and identify the assigned internal control value printed thereon. At block 1320, the system parses the scanned computer readable code into the corresponding assigned internal control value. At block 1322, the system 1300 comprises identifying, in the profile database, the physical address delivery point corresponding to the assigned internal control value. Thus, the system may access the profile database to identify the assigned delivery point code information for each profile that has one of the assigned internal control values printed on the item. At block 1324, the method 1300 comprises routing, by the item processing equipment, the item according to the identified physical address delivery point associated with the internal control value, and, at block 1326, the item is delivered to the identified physical address delivery point. In some embodiments, the method 1300 enables a carrier to user an MDD 204 to scan the item and deliver the item to the recipient.

In some embodiments, the method 1300 further comprises identifying a constraint associated with the received request, wherein the constraints limits the assigned internal control values that can be included in the list. Alternatively, or additionally, the method 1300 further filters the generated list based on the constraint and wherein the constraint limits the assigned internal control values based on one or more of a geographic area in which the item is to be delivered, a type of item on which the assigned internal control value can be applied, or a type of delivery point to which the item can be delivered. In some embodiments, the prefix code identifies to the item processing equipment how to identify the physical address delivery point for the corresponding assigned internal control value in the profile database. In some embodiments, the method 1300 comprises identifying, in the request, a subject of interest to be shared by each delivery point, wherein the subject of interest relates to the plurality of items to be distributed and wherein identifying profiles in the profile database further comprises identifying profiles in the profile database that include the subject of interest and have an assigned unique internal control value. In some embodiments, the method 1300 further comprises encrypting the assigned internal control values included in the list before providing the list to the requesting entity. In addition, the method 1300 provides instructions that cause the requesting entity to print each of the assigned internal control values on its own item as providing the list to the requesting entity.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general-purpose single- or multi-chip microprocessor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as and ran under a conventional operating system. For example, any industry standard programming languages for which many commercial compilers can be used to create executable code may be used. The system control may also be written using interpreted languages.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module, which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent, publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A method of dynamic item delivery comprising:

receiving a plurality of items by a distribution network, each of the plurality of items having thereon a unique computer readable code that encodes a unique identifier associated with one of a plurality of general geographic areas, wherein the unique identifier is not associated with a specific delivery point when the plurality of items are received by the distribution network;

transporting each of the plurality of items toward the one of the plurality of general geographic areas associated with the unique identifier on each item;

receiving a delivery request specifying an item type corresponding to the plurality of items, the delivery request identifying a specific delivery point within the one of the plurality of general geographic areas, wherein the delivery request does not specify an individual one of the plurality of items;

selecting one of the plurality of items and the associated unique identifier to fulfill the delivery request;

storing, in a memory, an association between one of the plurality of items and the associated unique identifier and the specific delivery point;

scanning the unique computer readable codes of the plurality of items on item processing equipment in the one of the plurality of general geographic areas; and in response to scanning the unique computer readable code that encodes the one of the unique identifiers:

identifying the specific delivery point from the scan on the item processing equipment based on the stored association; and delivering the item corresponding to the one of the unique identifiers to the specific delivery point.

2. The method of claim 1, further comprising, in response to receiving the delivery request:

determining that the specific delivery point is located within the one of the plurality of general geographic areas; and selecting the one of the unique identifiers based at least in part on the one of the unique identifiers not yet being associated with a specific delivery point.

3. The method of claim 1, further comprising estimating how many items will be requested to be delivered to specific delivery points in each of the plurality of general geographic areas.

4. The method of claim 3, wherein transporting each of the plurality of items comprises transporting a quantity of items corresponding to the estimated number of items for each of the plurality of general geographic areas.

5. The method of claim 1, wherein the delivery request comprises information regarding a purchaser of the item.

6. The method of claim 5, wherein the plurality of items are deliverable to the purchaser only on or after a specified date.

7. The method of claim 6, wherein transporting each of the plurality of items begins at a time before the specified date.

8. The method of claim 1, wherein the unique computer readable identifier further encodes information identifying a sender or shipper of the item.

9. The method of claim 1, further comprising:

receiving, from a provider of the plurality of items, a request for a plurality of computer readable codes;

generating the plurality of unique computer readable codes, the unique computer readable codes encoding information identifying the provider of the item and information indicating that the unique computer readable code is intended for use with a dynamic warehousing service.

10. The method of claim 1, further comprising applying the plurality of unique computer readable codes to the plurality of items.

11. A system for dynamic item delivery comprising:

a plurality of items, each of the items having thereon a unique computer readable code that encodes a unique identifier associated with one of a plurality of general geographic areas;

one or more vehicles for transporting the plurality of items toward the one of the plurality of general geographic areas;

item processing equipment located within the one of the plurality of general geographic areas, the item processing equipment comprising a scanner configured to read the unique computer readable codes;

a memory storing the unique identifier for each of the plurality of items and an association between each unique identifier and one of the plurality of general geographic areas; and one or more processors in communication with the memory, the one or more processors configured to:

receive, after the one or more vehicles have begun transporting the plurality of items toward the one of the plurality of general geographic areas, a delivery request specifying an item type corresponding to the plurality of items, the delivery request identifying a specific delivery point within the one of the plurality of general geographic areas, wherein the delivery request does not specify an individual one of the plurality of items;

select one of the plurality of items and the associated unique identifier to fulfill the delivery request;

store, in a memory, an association between the selected one of the plurality of items and the associated unique identifier and the specific delivery point;

receive scan information from the item processing equipment including the one of the unique identifiers;

identify the specific delivery point corresponding to the one of the unique identifiers from the received scan information; and cause the item corresponding to the one of the unique identifiers to be delivered to the specific delivery point.

12. The system of claim 11, wherein the one or more processors are further configured to:

determine that the specific delivery point is located within the one of the plurality of general geographic areas; and select the one of the unique identifiers based at least in part on the one of the unique identifiers not yet being associated with a specific delivery point.

13. The system of claim 11 wherein the one or more processors are further configured to estimate a quantity of items that are to be requested to be delivered to specific delivery points in each of the plurality of general geographic areas.

14. The system of claim 11, wherein the one or more processors are further configured to track the locations and unique computer readable codes of the plurality of items on vehicles en route to each of the plurality of general geographic areas.

15. The system of claim 11, wherein the received delivery request further comprises a request to deliver the item to an address of a purchaser of the item.

16. The system of claim 15, wherein the plurality of items are deliverable to the purchaser only on or after a specified date.

17. The system of claim 16, wherein requests from the purchaser are received at a time after the items are being transported to the general geographic area.

18. The system of claim 16, wherein the transportation of the item began before the specified date.

19. The system of claim 11, wherein the unique computer readable code further encodes information identifying a sender or shipper of the item.

20. A method of dynamic item delivery comprising:

receiving, from a provider of a plurality of items, a request for a plurality of computer readable codes;

generating, in response to the request, a plurality of unique computer readable codes, the plurality of unique computer readable codes encoding information identifying the provider of the item, an identifier associated with one of a plurality of general geographic areas, and an identifier that the unique computer readable code is intended for use with a dynamic warehousing service;

receiving the plurality of items by a distribution network, each of the plurality of items having thereon one of the generated plurality of unique computer readable codes, wherein each of the plurality of unique computer readable codes is not associated with a specific delivery point when the plurality of items are received by the distribution network;

transporting each of the plurality of items toward the one of the plurality of general geographic areas associated with the unique identifier on each item;

receiving a delivery request for an item of a type corresponding to the plurality of items, the delivery request identifying a specific delivery point within the one of the plurality of general geographic areas;

storing, in a memory, an association between one of the unique identifiers and the specific delivery point;

scanning the unique computer readable codes of the plurality of items on item processing equipment in the one of the plurality of general geographic areas; and in response to scanning the unique computer readable code that encodes the one of the unique identifiers:

identifying the specific delivery point from the scan on the item processing equipment based on the stored association; and delivering the item corresponding to the one of the unique identifiers to the specific delivery point.

\* \* \* \* \*